US010054285B2

(12) United States Patent
Demuynck et al.

(10) Patent No.: US 10,054,285 B2
(45) Date of Patent: Aug. 21, 2018

(54) LIGHT FIXTURE AND OPTIC WITH LIGHT-TRANSMISSIVE SHIELD

(71) Applicant: Cree, Inc., Durham, NC (US)

(72) Inventors: Randy Demuynck, Wake Forest, NC (US); Lisa Barglind, Franksville, WI (US); Charles Hobson, Waterford, WI (US); Mark Dixon, Morrisville, NC (US); Kurt Wilcox, Libertyville, IL (US)

(73) Assignee: Cree, Inc., Durham, NC (US)

( * ) Notice: Subject to any disclaimer, the term of this patent is extended or adjusted under 35 U.S.C. 154(b) by 0 days.

(21) Appl. No.: 15/192,463

(22) Filed: Jun. 24, 2016

(65) Prior Publication Data

US 2017/0370553 A1 Dec. 28, 2017

(51) Int. Cl.
| | |
|---|---|
| F21V 1/00 | (2006.01) |
| F21V 3/02 | (2006.01) |
| F21V 5/04 | (2006.01) |
| F21V 7/00 | (2006.01) |
| F21V 31/00 | (2006.01) |
| F21V 29/83 | (2015.01) |
| F21V 29/74 | (2015.01) |

(Continued)

(52) U.S. Cl.
CPC ......... *F21V 3/02* (2013.01); *F21S 8/08* (2013.01); *F21V 5/04* (2013.01); *F21V 7/0091* (2013.01); *F21V 29/74* (2015.01); *F21V 29/83* (2015.01); *F21V 31/005* (2013.01); *F21Y 2115/10* (2016.08)

(58) Field of Classification Search
CPC .... F21K 9/00; F21K 9/20; F21S 2/005; F21S 8/033; F21S 8/086; F21S 9/022

USPC .......................................................... 362/235
See application file for complete search history.

(56) References Cited

U.S. PATENT DOCUMENTS

| | | | |
|---|---|---|---|
| 7,350,940 B2 | 4/2008 | Haugaard et al. | |
| 7,686,469 B2 * | 3/2010 | Ruud ...................... | F21S 2/005 362/101 |

(Continued)

OTHER PUBLICATIONS

Cree LEDway® Series High Output LED Street Light Installation Instructions. (2014).

(Continued)

*Primary Examiner* — Seung Lee
(74) *Attorney, Agent, or Firm* — Jansson Munger McKinley & Kirby Ltd.

(57) ABSTRACT

A light-emitting arrangement including an optical member and a light-transmissive shield member secured with respect to the optical member at least partially defines a light-fixture exterior and having a back side facing a circuit board and receiving a gasket which encircles the circuit board to provide a water seal thereabout. The gasket has a pair of spaced apart outwardly-extending lateral fingers engaging lateral sides of a recess formed by the optical-member back side, and at least one inner finger extending into the recess offset from the recessed lateral sides. A peripheral wall extends from the optical-member back side outwardly around the gasket and engaging an emitter-supporting to minimize water ingress toward the gasket. An opaque shield is disposed along at least a portion of a perimeter of the optical member and configured and dimensioned to minimize or block distribution of light in at least one direction opposite the direction of the primary illumination.

21 Claims, 34 Drawing Sheets

(51) Int. Cl.
*F21S 8/08* (2006.01)
*F21Y 115/10* (2016.01)

(56) References Cited

U.S. PATENT DOCUMENTS

| | | | |
|---|---|---|---|
| 8,070,306 | B2 | 12/2011 | Ruud et al. |
| 8,641,234 | B2 * | 2/2014 | Dube ............... F21S 8/086 362/240 |
| 9,401,103 | B2 | 7/2016 | Wilcox et al. |
| 2009/0034261 | A1 | 2/2009 | Grove |
| 2009/0251898 | A1 | 10/2009 | Kinnune et al. |
| 2010/0314985 | A1 | 12/2010 | Premysler |
| 2012/0025711 | A1 | 2/2012 | Best et al. |
| 2013/0010468 | A1 * | 1/2013 | Stoll ............... F21V 29/004 362/235 |
| 2015/0316249 | A1 * | 11/2015 | Kinnune ............ F21K 9/60 362/235 |

OTHER PUBLICATIONS

Cree OSQ Series LED Area Light Installation Instructions. (2014).
Cree RSW Series LED Street and Are Light Installation Instructions. (2015).
Cree LEDway® LED Streetlight Back Light Shield Installation Instructions. (2016).
Philips Gardco EcoForm LED site and area luminaire, Koninklijke Philips N.V. (Aug. 2013).
Philips Gardco PureForm Specification Grade LED Luminaires, Koninklijke Philips N.V. (Sep. 2013).
Philips RoadView Series, Philips Roadway Lighting. (2011).

\* cited by examiner

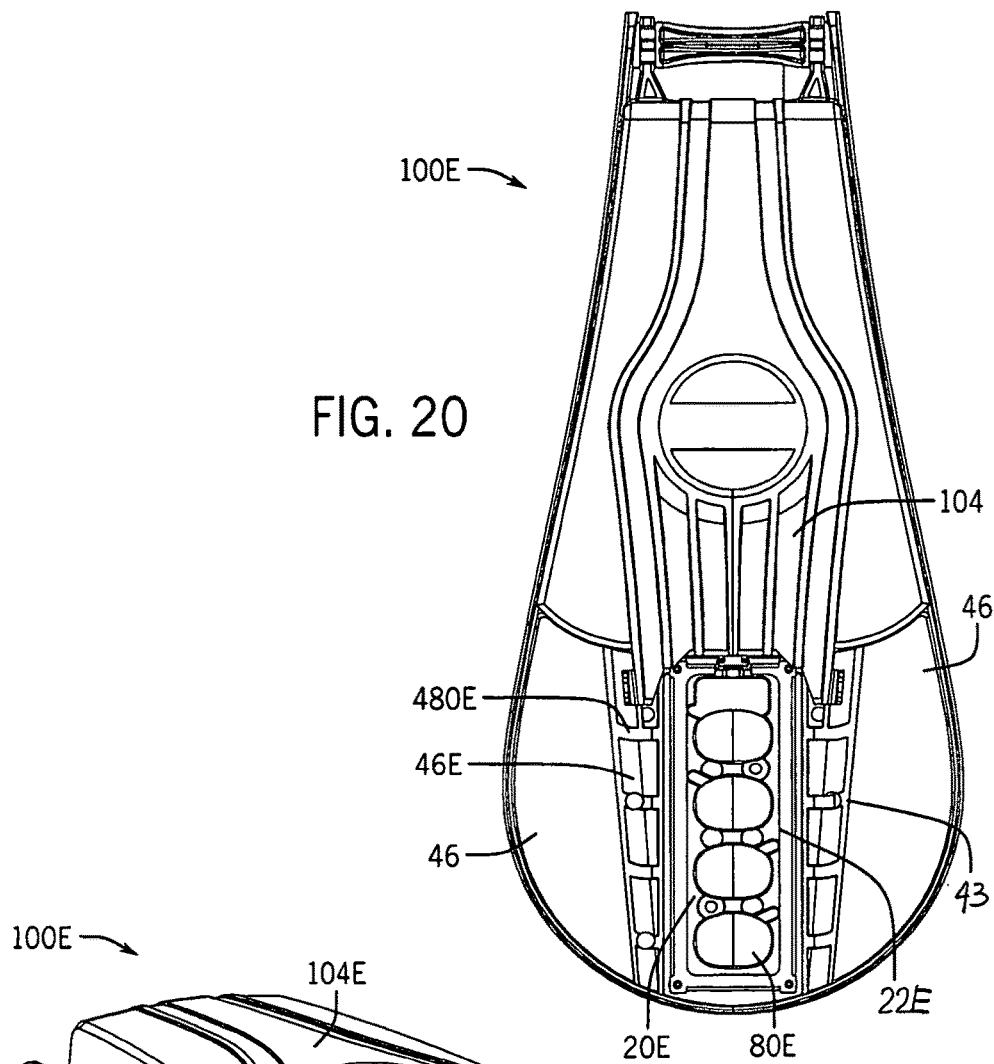

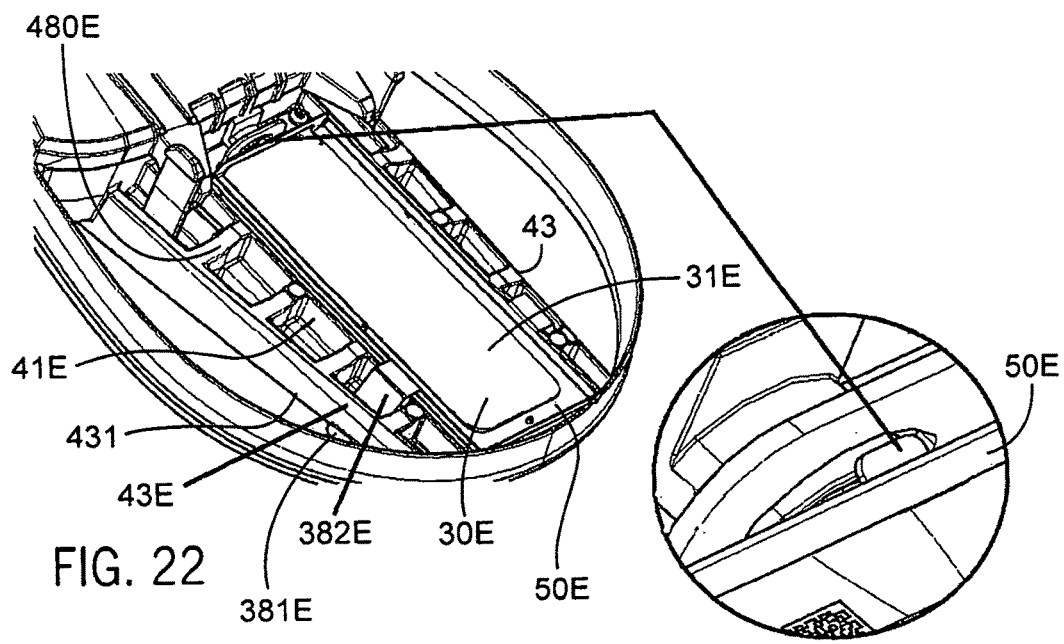
FIG. 22
FIG. 22A
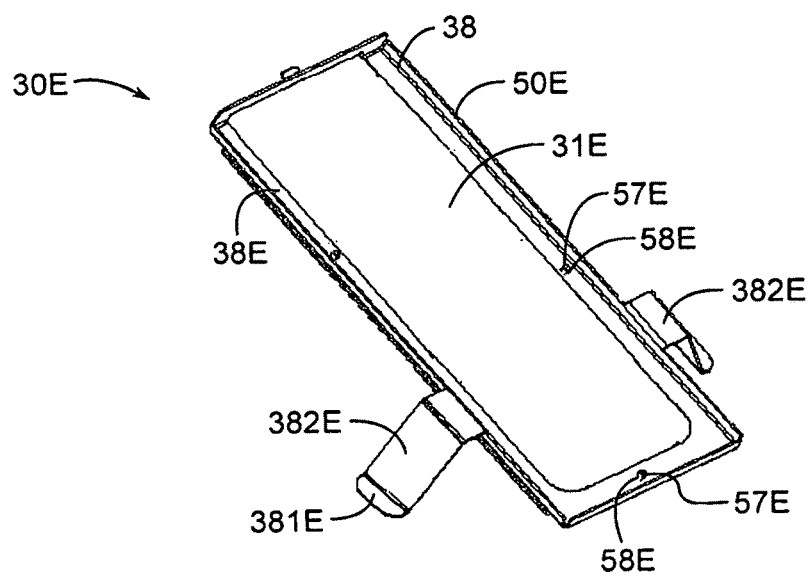
FIG. 23

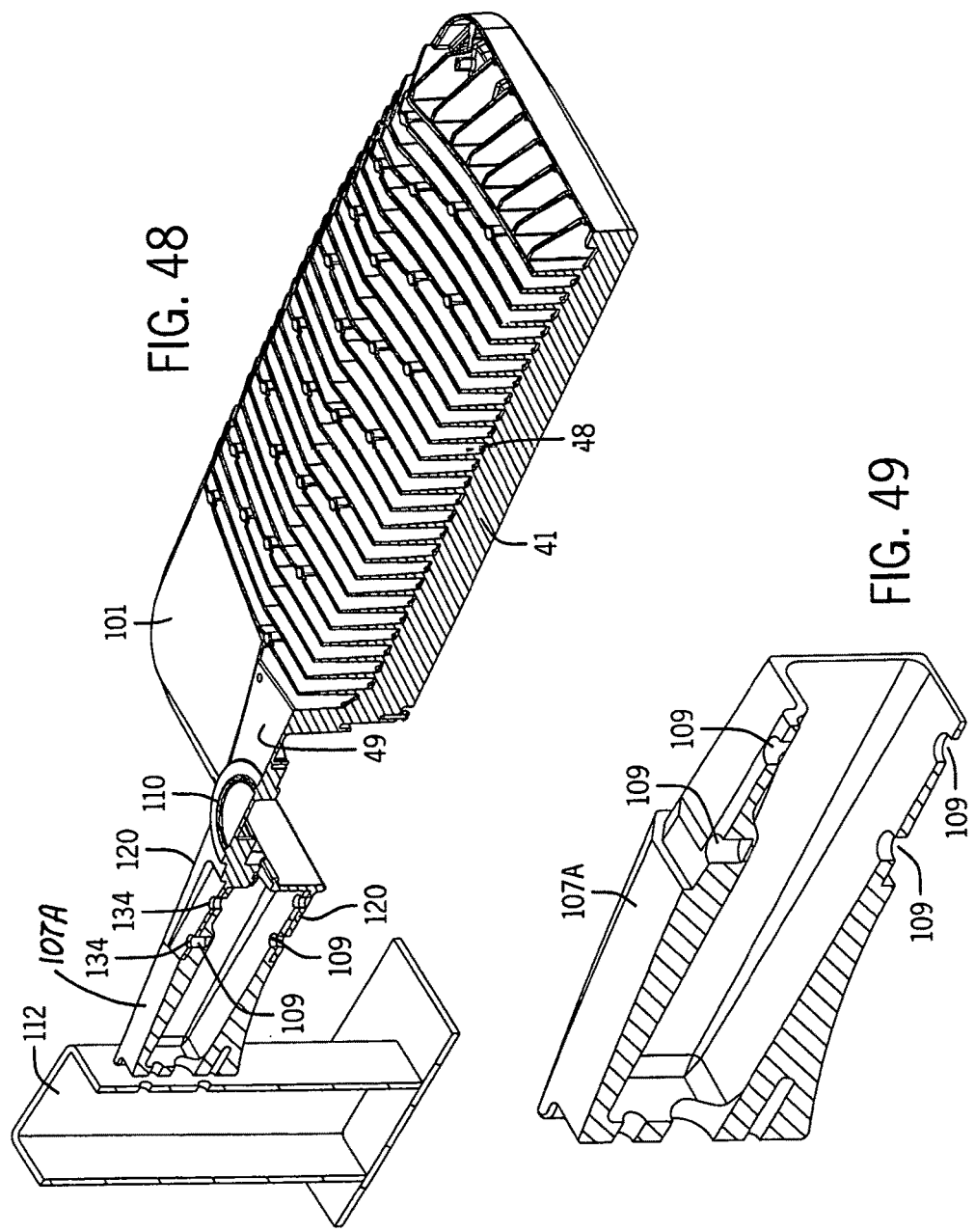

LIGHT FIXTURE AND OPTIC WITH LIGHT-TRANSMISSIVE SHIELD

FIELD OF THE INVENTION

This invention relates to light fixtures and, more particularly, to light fixtures using light-emitting diodes (LEDs).

BACKGROUND OF THE INVENTION

In recent years, the use of light-emitting diodes (LEDs) in development of light fixtures for various common lighting purposes has increased, and this trend has accelerated as advances have been made in the field. Indeed, lighting applications which previously had typically been served by fixtures using what are known as high-intensity discharge (HID) lamps are now being served by LED light fixtures. Such lighting applications include, among a good many others, roadway lighting, factory lighting, parking lot lighting, and commercial building lighting.

High-luminance light fixtures using LED modules as a light source present particularly challenging problems. One particularly challenging problem for high-luminance LED light fixtures relates to heat dissipation. Some of the advances in the field are disclosed in U.S. Pat. Nos. 7,686,469 and 8,070,306.

Improvement in dissipating heat to the atmosphere is one significant objective in the field of LED light fixtures. It is of importance for various reasons, one of which relates to extending the useful life of the lighting products. Achieving improvements without expensive additional structure and apparatus is much desired. This is because a major consideration in the development of high-luminance LED light fixtures for various high-volume applications, such as roadway lighting, is controlling product cost even while delivering improved light-fixture performance.

Another challenge is that LEDs produce high temperatures during operation and, in certain fixture orientations, need to be isolated from possible contact with flammable objects to avoid damage to LED optics, as well as to maintain intended light distribution characteristics.

SUMMARY OF THE INVENTION

The present invention relates to improvements in LED light fixtures and, in particular to improvements in light-emitting arrangements.

In certain embodiments, a light-emitting arrangement comprises an optical member and a light-transmissive shield member is secured with respect to the optical member. The optical member is configured for distribution of emitted light and at least partially defines a light-fixture exterior. The light-transmissive shield member is secured with respect to the optical member. The light-transmissive shield member may be removably secured with respect to the optical member.

The light-transmissive shield member serves to facilitate unobstructed distribution of light. The light-transmissive shield member also serves to minimize damage to exterior surfaces of the optical member.

The light-transmissive shield member may span the optical member. In some of such versions, the light-transmissive shield member comprises a substantially planar transparent sheet.

In certain embodiments, the optical member has a peripheral region extending from a light distribution region and supporting the shield member. The optical member may have a plurality of lens portions defining the light distribution region surrounded by the peripheral region.

The peripheral region of the optical member may have a first mounting member engaged by a second mounting member which secures the light-transmissive shield member with respect to the optical member. In one example of such embodiments, the peripheral region defines a hollow which receives a fastener shank extending from a fastener head and through an aperture defined by the substantially planar transparent sheet. The hollow may be a cavity. Alternatively or additionally, the hollow may be an aperture through the peripheral flange of the optical member. The fastener may be of any suitable type. For example, the fastener may be a self-tapping screw. A washer may also be disposed between the fastener head and an outward surface of the sheet.

Additionally or alternatively, the light-emitting arrangement may include a spacer disposed between the optical member and the transparent sheet and dimensioned according to a minimal distance between the optical member and the transparent sheet. The minimal distance may be determined between the light distribution region of the optical member and the transparent sheet.

In some embodiments, the peripheral region forms a shoulder about the hollow. One example of the spacer is a sleeve over the fastener shank. Such spacer may extend from one end at the transparent sheet to an opposite end against the shoulder. Another type of the spacer are molded parts on the inside corners of the shield and positioned against the front surface of the peripheral region. Still another type of the spacer may include leg portions of a bracket, such leg portions determining spacing between the light distribution region of the optical member and the substantially planar transparent sheet. These types of spacers may each be used alone or in combination with one or more types of spacers.

The light-emitting arrangements may include an annular gasket at the transparent sheet. The annular gasket may be positioned between the transparent sheet and the corresponding end of the sleeve. In some examples, the gasket may be smaller than an outer dimension of the sleeve to accommodate compression force exerted by the fastener head during tightening toward the optical member.

Additionally or alternatively, the substantially planar transparent sheet may define a recess about the fastener-receiving aperture at the inward surface of the sheet. For such embodiments, the sleeve may have a neck portion with an outer dimension corresponding to the inner size of the recess. In some embodiments, the neck portion of the sleeve spacer may be fitted into the inward recess of the sheet prior to insertion of the fastener to facilitate securement of the light-transmitting shield member with respect to the optical member.

In some of such embodiments, the compression gasket may be larger than the outer dimension of the neck portion and smaller than an outer dimension of the sleeve. Alternatively or additionally, the compression gasket may fit inside the recess. In some of such embodiments, the outer dimension of the gasket may correspond to the inner size of the recess. The gasket may be shaped to conform to the shape of the recess and extend outwardly therefrom along the inward surface of the sheet. Some versions of the gasket may extend through the aperture and outwardly along one or both of the inward and outward surfaces of the sheet. In some other versions, there may be a pair of gaskets each in contact with one of the inward and outward surfaces of the sheet.

The peripheral region of the optical member has front and back sides. The peripheral region may have a peripheral flange. In some embodiments, the peripheral flange may extend away from an emitter-supporting surface and form a space between the peripheral flange of the optical member and light-fixture surfaces supporting the light-emitting arrangement.

The light-transmissive shield member may include lateral members extending from the substantially planar transparent sheet. In some embodiments, the lateral members engage the back side of the peripheral region, thereby securing the shield member to the optical member.

In certain embodiments, the light-transmissive shield member is one piece. In such embodiments, the lateral members are walls extending from the planar transparent sheet and enveloping the optical member. In some of such embodiments, the lateral members may have inward protrusions configured for snap engagement with the peripheral region of the optical member. One example of such snap engagement is by the lateral members extending over and under an edge of the flange.

Some embodiments may include a spacer on the inside corners of the shield member for positioning against the front surface of the peripheral region. Such spacer may be formed by molded parts of the one-piece shield.

In some alternative embodiments or in combination with the previous embodiments, the lateral members include at least one mounting bracket engaging the substantially planar transparent sheet and extending therefrom to a retention portion which engages the peripheral region of the optical member.

The at least one mounting bracket may have a sheet-engaging portion configured to securely engage the planar transparent sheet. In some examples, the sheet-engaging portion fits over an edge region of the planar transparent sheet such that surfaces of the sheet-engaging portion are against each of the inward and outward surfaces of the sheet. The sheet-engaging portion may be configured to have a spring action toward the sheet-engaging portion, thereby compressing surfaces of the sheet-engaging portion for secure holding of the edge region of the planar transparent sheet.

The retention portion of each bracket may be configured for snap engagement with the optical member. Such engagement may be a snap fit attachment to an edge of the peripheral flange of the optical member such that the retention portion engages the back side of the peripheral flange of the optical member.

Each retention bracket may include a leg portion extending between the sheet-engaging portion and the retention portion. The leg portion may accommodate a resilient spring action of the retention portion to be pulled beyond and over the edge of the peripheral flange of the optical member for engagement of the back side of the peripheral flange. Each bracket may terminate with a tab extending from the retention portion. The tab may facilitate gripping and pulling of the bracket beyond the peripheral-flange edge during securement of the retention portion to the edge of the peripheral flange.

In some embodiments, the leg portion determines the spacing between the light distribution region of the optical member and the substantially planar transparent sheet. The leg portion may extend along the entire perimeter of the optical member. The leg portion may be of many suitable materials. Some examples of such materials include opaque materials. In addition or alternatively, such materials may be reflective. The leg portion of any of such materials may be configured to serve as a light barrier minimizing distribution of light in undesirable direction(s).

In certain embodiments, the mounting bracket includes a plurality of brackets. Each of the plurality of brackets may be attached to one of the straight edges of the planar transparent sheet. The brackets may be attached to each other. Such attachment may be by connectors extending between the brackets. Each bracket may have one connector extending to the adjacent bracket. In addition or alternatively, there may be connecting brackets, each including a pair of connectors extending in opposite directions to the brackets adjacent to opposite sides of the connecting bracket. The connectors may be made as one piece with a respective bracket from which they extend and be secured to the adjacent bracket. Such securement may be with rivets or other suitable fasteners. The connectors may extend from the leg portion of a respective bracket and be secured to the leg portion of the adjacent bracket. In some embodiments, each bracket my have a connector extending from one side for securement to the adjacent bracket. In such versions, the brackets may be connected in a daisy-chain-like manner.

Some embodiments of an LED light fixture may have a frame including emitter-supporting structures and adjacent structures. The optical member is disposed at the emitter-supporting structures and configured for distribution of emitter light and at least partially defines an exterior of the light fixture. The light-transmissive shield member is secured with respect to the optical member.

In certain embodiments, the light-transmissive shield member includes a mounting member which engages the adjacent structures, thereby securing the shield member with respect to the optical member.

The shield member may be one-piece including a substantially planar transparent sheet with the mounting member extending from the sheet. Alternatively or in combination, the mounting member may be a separate piece attached to the substantially planar transparent sheet. In some embodiments, the mounting member may be a frame member secured to the substantially planar transparent sheet. Such frame member may extend over the peripheral region of the optical member with the substantially planar transparent sheet being secured between the frame and the peripheral region of the optical member.

The adjacent structures may define at least one open space permitting air and water flow through the light fixture. In some of such embodiments, the mounting member extends into and through the open space and engages an opposite side of the corresponding adjacent structure. Some examples of such open spaces may include one or more venting apertures formed by the fixture frame and fully surrounded by the fixture frame.

The adjacent structures may include heat-dissipating structures configured for conducting heat away from the heat sink region of the emitter-supporting structures. Some of such heat dissipating structures may include fins extending across a respective venting aperture. The light-fixture structures adjacent to the light-emitting arrangement may also include portions of the fixture frame which form one or more regions of an exterior profile of the fixture and are fully exposed to the outside. For example, the adjacent structures may include lateral sides of the fixture frame.

Some examples of the mounting member include at least one pair of mounting arms extending in opposite directions. The mounting arms may extend from opposite sides of the light-transmissive shield member. In some of such embodiments, the mounting arms extend in opposite directions away from each other. Alternatively or in addition, the opposite mounting arms extend from the mounting member toward each other. Some embodiments may include a combination of both.

Some embodiments of the LED light fixture include structures forming a substantially closed chamber enclosing power-circuitry unit. The open spaces may include one or more openings permitting fluid flow through the fixture between the chamber and the emitter-supporting structures.

Certain embodiments of the LED light fixture include at least one light emitter on a circuit board at an emitter-supporting surface of an emitter-supporting structure. Some of such embodiments have an optical member having a back side facing the circuit board and defining a recess configured for receiving a gasket which encircles the circuit board to provide a water seal thereabout.

Some examples of the gasket have a pair of spaced apart lateral fingers and at least one inner finger. The lateral fingers engage lateral sides of the recess and extend outwardly from the recess. The at least one inner finger extends into the recess and is offset from the lateral sides of the recess. The at least one inner finger may include a pair of spaced apart pair of inner fingers each offset from the corresponding lateral side of the recess and offset from the lateral fingers. The inner and outwardly-extending lateral fingers may form a gasket body therebetween. The gasket may also include a middle finger extending outwardly between the lateral fingers.

The term "ambient fluid" as used herein means air and/or water around and coming into contact with the light fixture.

As used herein in referring to portions of the devices of this invention, the terms "upward," "upwardly," "upper," "downward," "downwardly," "lower," "upper," "top," "bottom" and other like terms assume that the light fixture is a position for downward illumination.

In descriptions of this invention, including in the claims below, the terms "comprising," "including" and "having" (each in their various forms) and the term "with" are each to be understood as being open-ended, rather than limiting, terms.

BRIEF DESCRIPTION OF THE DRAWINGS

FIG. 20 is a light-emitting plan view of still another example of an LED light fixture.

FIG. 21 is a perspective view of the LED light fixture of FIG. 20.

FIG. 22 is a fragmentary perspective view illustrating an example of a light-transmissive shield member secured to the LED light fixture of FIGS. 20 and 21.

FIG. 22A is a larger-scale fragmentary perspective view of the LED light fixture of FIG. 22 showing a shield securement feature.

FIG. 23 is a perspective view of the light-transmissive shield member of FIG. 22.

FIG. 48 is a perspective cross-sectional view from a side opposite the light-emitting side of the LED light fixture of FIG. 47 showing details of the pole-mounting arrangement.

FIG. 49 is a front perspective cross-sectional view of a mounting fitter seen in the pole-mounting arrangement of FIG. 48.

DETAILED DESCRIPTION OF EXEMPLARY EMBODIMENTS

Figure 1:
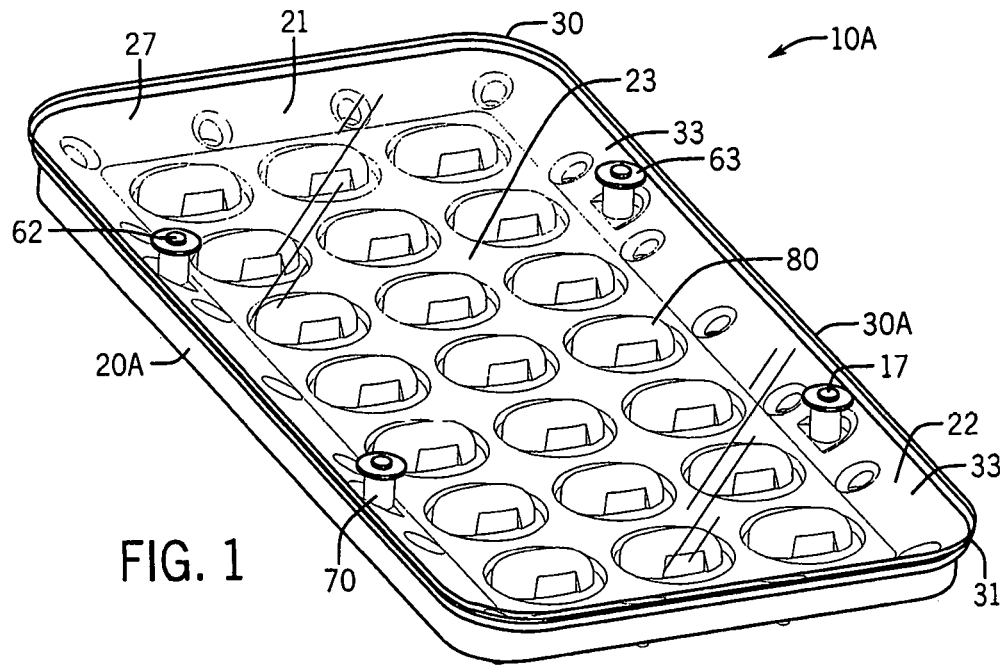
FIG. 1 is a perspective view of an exemplary embodiment of a light-emitting arrangement according to the present invention.

The figures illustrate exemplary embodiments of this invention. Common or similar parts in different embodiments are given the same numbers in the drawings.

FIGS. 1-33 illustrate the aspects of the present invention related to improvements in light-emitting arrangements 10 which include an optical member 20 and a light-transmissive shield member 30.

Figure 2:
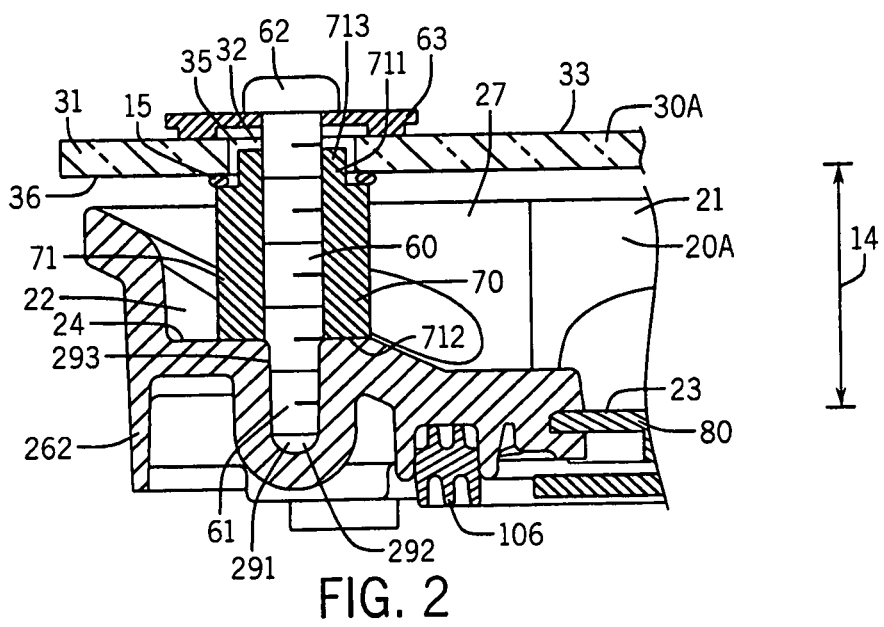
FIG. 2 is a fragmentary cross-sectional view of the light-emitting arrangement of FIG. 1.

FIGS. 1 and 2 illustrate one exemplary embodiment of a light-emitting arrangement 10A which includes an optical member 20A and a light-transmissive shield member 30A secured with respect to optical member 20A.

Figure 11:
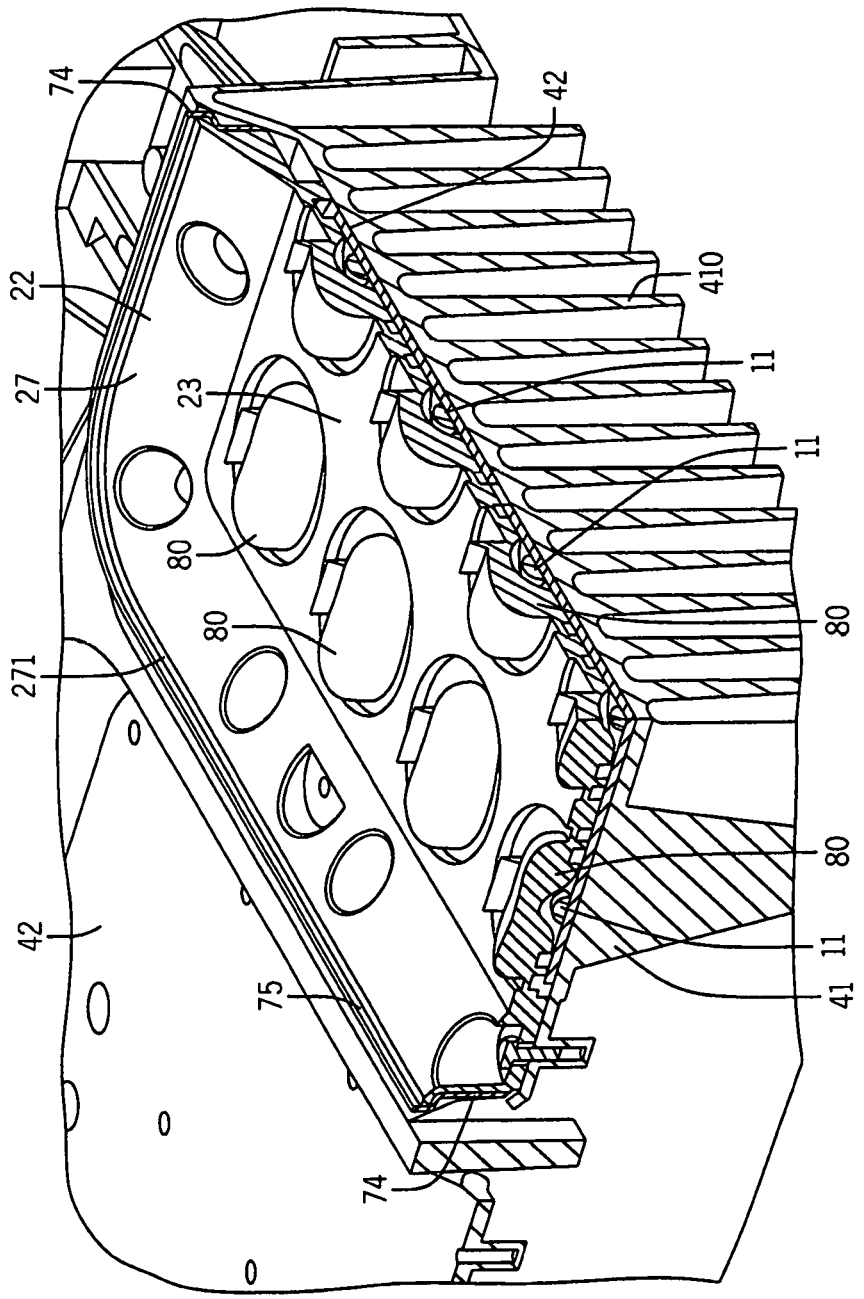
FIG. 11 is a perspective fragmentary cross-sectional front view of an embodiment of an LED light fixture including an opaque shield member disposed at an optical member secured to an emitter-supporting structure and enclosing an LED light source.
Figure 13:
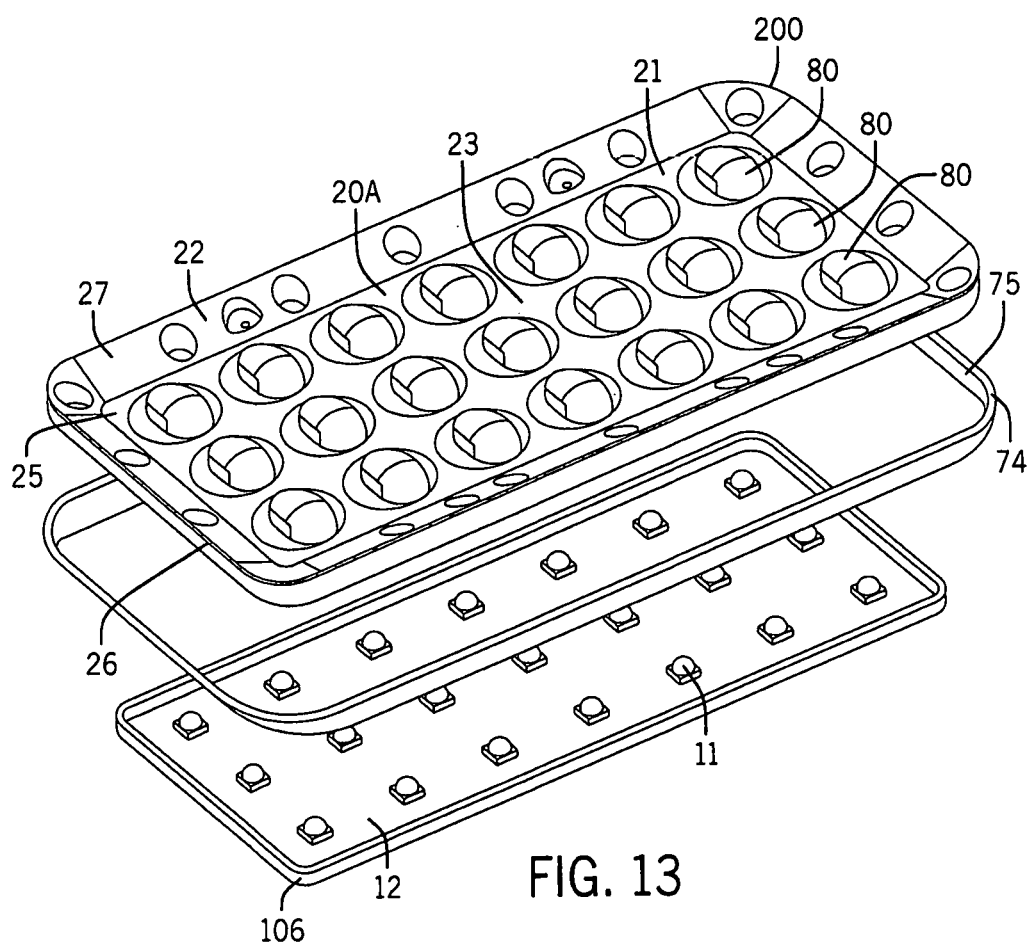
FIG. 13 is an exploded perspective view of the LED light source with the opaque shield member and an optical member as in FIG. 11.

FIGS. 1, 3, 11 and 13 best illustrate optical member 20A which is configured for distribution of emitted light. Optical member 20A has an optical-member carrier piece 21 with a plurality of lens portions 80 each for alignment with a corresponding one of light sources 11 on circuit board 12, as seen in FIGS. 11 and 13. One example of a secondary lens 80A forming such lens portions 80 is illustrated in FIGS. 34-37 discussed later in this section.

Figure 52:
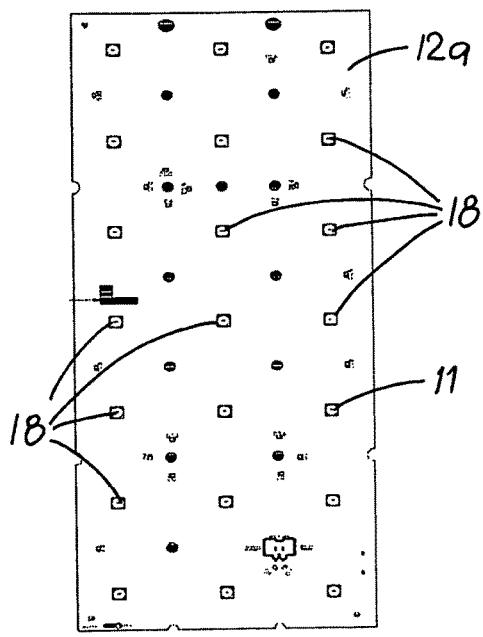
FIGS. 52-55 are plan views of exemplary configurations of a circuit board.
Figure 53:
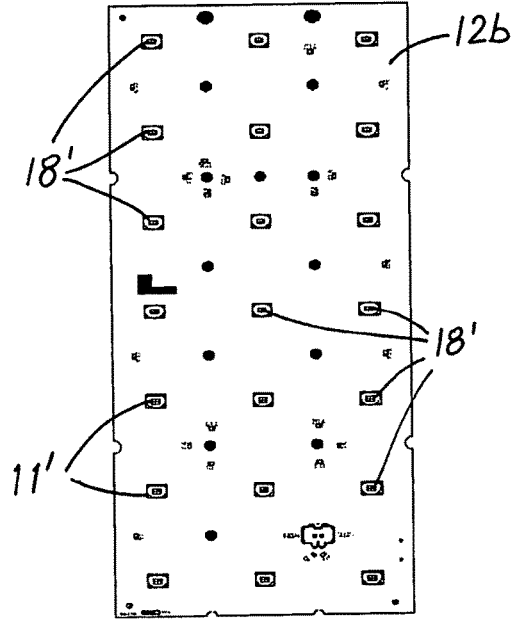
Figure 54:
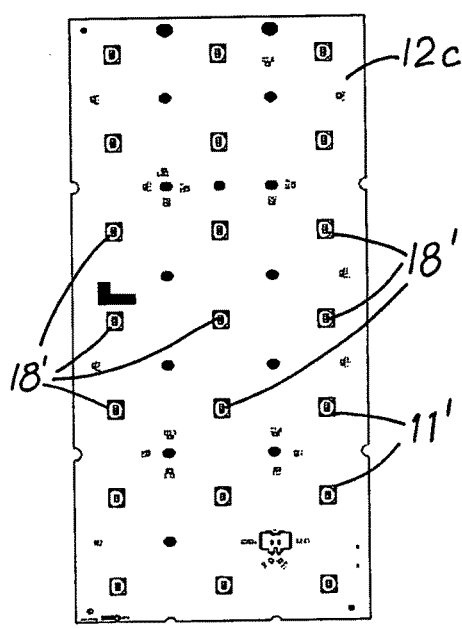
Figure 55:
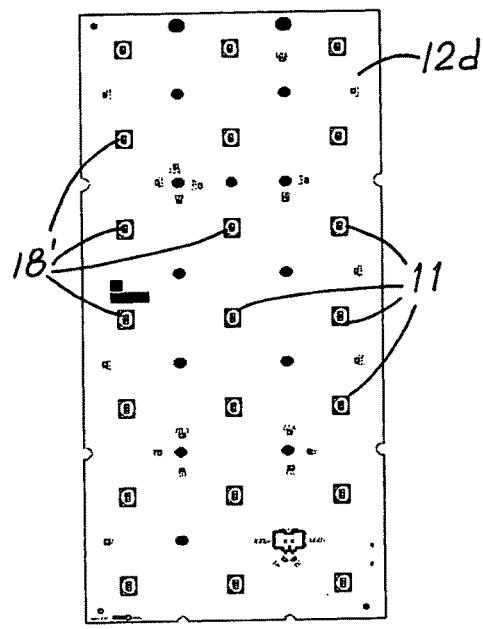

Various types of circuit boards may be utilized for particular applications. FIGS. 52-55 illustrate examples of circuit boards with LED packages having different types of optics. FIG. 52 shows circuit board 12a (referred to as XHP70) with symmetric LED optics 18 (one example being type V optics) typically applicable for Flood and Sign illumination. FIG. 53 shows an LED board 12B (referred to as MDA1450) with front-facing LEDs with asymmetric optics 18'. FIG. 54 shows an LED board 12c (referred to as MDA1450 with right rotation) with right-facing LEDs with asymmetric optics 18'. FIG. 55 shows an LED board 12d (referred to as MDA1450 with left rotation) with left-facing LEDs with asymmetric optics 18'. In certain embodiments boards similar to the illustrated boards may be used for lower lumen variants with some of the LEDs positions on the board being unpopulated.

Light sources 11 may be in the form of LED packages with optical lenses of the types disclosed in co-owned patent application Ser. No. 13/441,558, filed Apr. 6, 2012, the entire contents of which being incorporated herein by reference.

The following is an exemplary summary of performance characteristics for light fixtures incorporating at least one or more of the feature disclosed herein. (It should be noted that this summary shows lowest optical efficacy.)

| SKU | LED Type | LED Count | Color Temp | CRI | Drive Current | Optics | Optical Efficacy | Estimated Lumen |
|---|---|---|---|---|---|---|---|---|
| 65000lm level 70CRI | XHP70 | 42 | 4000 K. | 70 | 1050 | 5ME | 90.80% | 67137 |
|  |  |  | 5700 K. |  |  | 5ME | 90.80% | 68182 |
|  | MDA1450 |  | 4000 K. |  |  | 2ME | 89.20% | 64999 |
|  |  |  | 5700 K. |  |  | 2ME | 89.20% | 66293 |
| 50000lm level 70CRI | XHP70 | 32 | 4000 K. |  |  | 5ME | 90.80% | 51152 |
|  |  |  | 5700 K. |  |  | 5ME | 90.80% | 51948 |
|  | MDA1450 |  | 4000 K. |  |  | 2ME | 89.20% | 49523 |
|  |  |  | 5700 K. |  |  | 2ME | 89.20% | 50509 |
| 40000lm level 70CRI | XHP70 | 26 | 4000 K. |  |  | 5ME | 90.80% | 41561 |
|  |  |  | 5700 K. |  |  | 5ME | 90.80% | 42208 |
|  | MDA1450 |  | 4000 K. |  |  | 2ME | 89.20% | 40237 |
|  |  |  | 5700 K. |  |  | 2ME | 89.20% | 41038 |
| 52000lm level 90CRI | XHP70 | 42 | 5000 K. | 90 | 1050 | 5ME | 90.80% | 53085 |
|  | MDA1450 |  |  |  |  | 2ME | 89.20% | 46825 |
| 40000lm level 90CRI | XHP70 | 32 |  |  |  | 5ME | 90.80% | 40446 |
|  | MDA1450 |  |  |  |  | 2ME | 89.20% | 35648 |
| 32000lm level 90CRI | XHP70 | 26 |  |  |  | 5ME | 90.80% | 32862 |
|  | MDA1450 |  |  |  |  | 2ME | 89.20% | 28987 |

Figure 3:
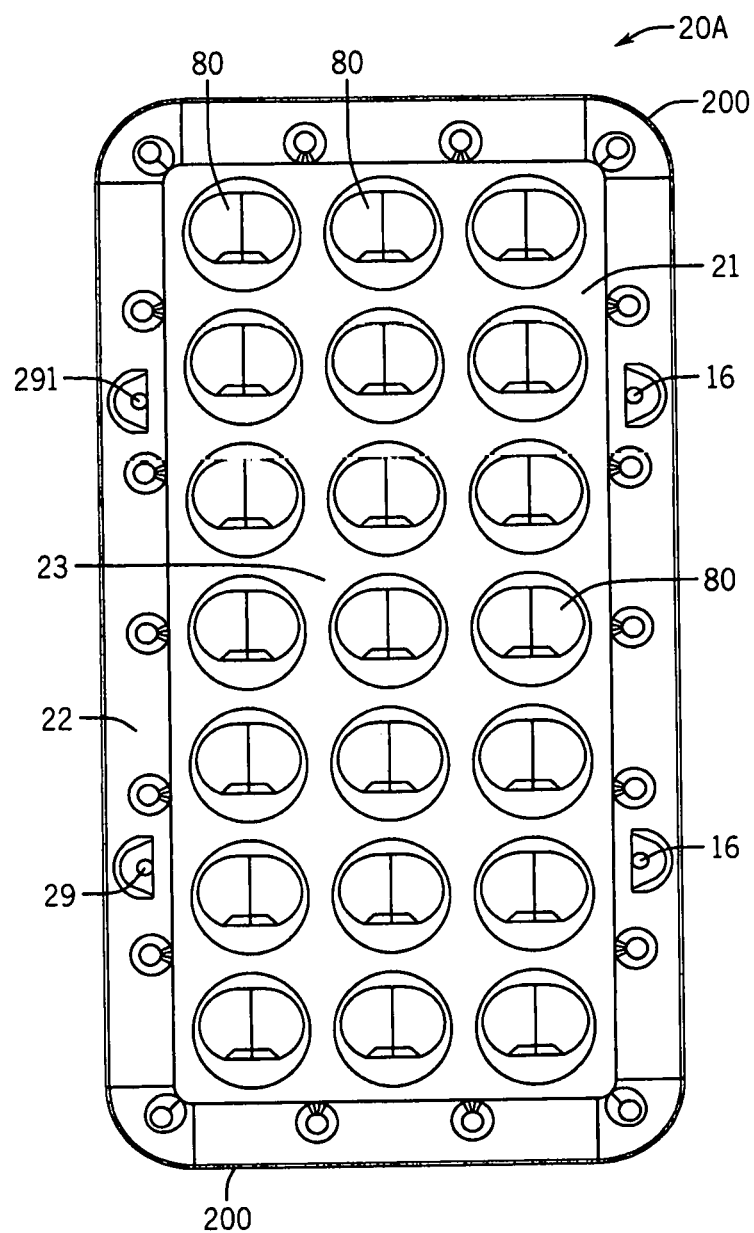
FIG. 3 is a top plan view of an optical member of the light-emitting arrangement of FIG. 1.

FIGS. 1-5, 8-11 and 13 illustrate optical member 20 with a peripheral region 22 extending from a light distribution region 23 and supporting shield member 30. FIGS. 1, 3 and 13 best show the plurality of lens portions 80 defining light distribution region 23 surrounded by peripheral region 22. Optical member 20 has a light-emitting front side 25 and a back side 26 facing circuit board 12, as seen in FIGS. 8, 11 and 13-15.

FIGS. 1-5, 8-11 and 13-16 show peripheral region 22 of optical member 20 forming a peripheral flange 27 extending away from an emitter-supporting surface 42 and forming a space 13 between peripheral flange 27 of optical member 20 and light-fixture surfaces 42 supporting light-emitting arrangement 10.

FIGS. 17, 18, 20, 21, 26-28 and 47 show that front side 25 of optical member 20 is outside of any enclosures of a light fixture 100. In other words, an outer surface 28 of front side 25 of optical member 20 is fully exposed such that optical member 20 at least partially defines an exterior 101 of light fixture 100. An exemplary light fixture 100 may be of the type disclosed in co-owned patent application Ser. No. 14/269,077, filed May 2, 2014, the entire contents of which being incorporated herein by reference.

In several illustrated examples, light-transmissive shield member 30 is secured with respect to optical member 20. Light-transmissive shield member 30 is shown removably secured with respect to the optical member 20.

Figure 10:
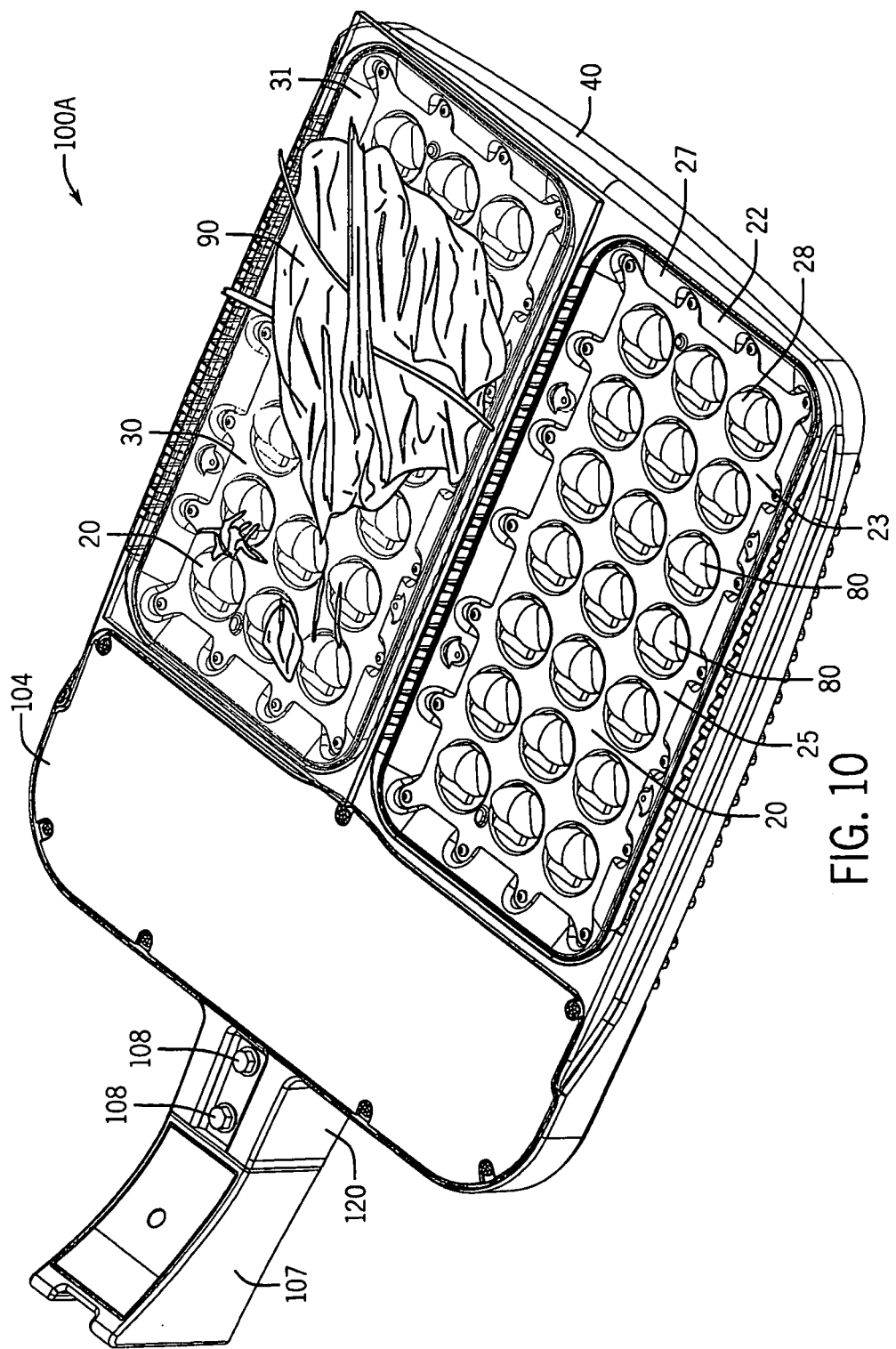
FIG. 10 is a schematic illustration of testing performed with an example of a light-transmissive shield member according to the present invention.

FIG. 10 shows fixture 100A positioned for upward illumination. Some examples of such fixture orientation are for illumination of bill boards or walls. In applications where the fixture is mounted upside down to illuminate bill boards or walls, various foreign materials and debris may accumulate on the optical member, as seen in FIG. 10. Such accumulation of foreign material has been shown to cause failure modes. One failure is due to the radiant energy of the light source heating the debris to a point where it causes the lens material to deform. An additional or alternate failure mode is light being blocked by the debris or the distribution pattern being altered.

FIG. 10 illustrates light-transmissive shield 30 being provided to mitigate the collection of debris 90 on optical member 20. Light-transmissive shield 30 is configured to minimize damage to exterior surfaces 28 of optical member 20, to facilitate unobstructed distribution of light and to minimize alteration of the light distribution pattern.

It should be noted that the light-transmissive shield is positioned in a way that avoids an interference with the thermal performance of the light fixture. An optimal distance between the shield and the optical member is typically determined experimentally.

While the light-transmissive shield member is most useful for when a light fixture is mounted upside down (for example, for bill board or façade lighting), it is also useful wherever a fixture is mounted upward and has the potential of debris accumulating on the lenses.

Light-transmissive shield member 30 is shown spanning optical member 20. In the illustrated versions, light-transmissive shield member 30 includes a substantially planar transparent sheet 31 which is shown rectangular. It should be understood that the substantially planar sheet may have any geometric configuration suitable for a particular configuration of an optical member, including various polygons, straight-edge shapes, ovals, circles and combinations thereof.

The light-transmissive shield may be made of a variety of suitable materials Some examples of such materials include glass, PMMA (polymethyl methacrylate) also known as acrylic, polycarbonate, or any other material that exhibits high optical transmission and can withstand a high sun load (radiant energy), and other environmental conditions such as temperature, shock, vibration, etc.

Peripheral region 22 of optical member 20 is shown to have a first mounting member 16 engaged by a second mounting member 17 which secures light-transmissive shield member 30 with respect to optical member 20.

FIGS. 1-3 illustrate peripheral region 22 defining a hollow 29 which receives a shank 61 of a fastener 60 extending from a fastener head 62 and through an aperture 32 defined by substantially planar transparent sheet 31. FIG. 2 shows hollow 29 as a cavity 291 with an inner closed end 292 and an opposite open end 293. Alternatively or additionally, hollow 29 may be an aperture through peripheral flange 27 of optical member 20. FIG. 2 also shows a washer 63 disposed between fastener head 62 and an outward surface 33 of sheet 31.

Light-emitting arrangement 10 is shown to include a spacer 70 disposed between optical member 20 and transparent sheet 31. Spacer 70 is dimensioned according to a minimal distance 14 between optical member 20 and transparent sheet 30. FIG. 2 illustrates an example of such minimal distance 14 being determined between light distribution region 23 of optical member 20 and transparent sheet 31.

An exemplary spacing determination of 25 mm between glass shield and optic was reached when the operating temperature of the optic lens is less than 80° C.+margin. This is based on the UL service temperature of 95° C. minus 15° C. for the 40° C. ambient condition. The determination started at 5 mm and moved up in 5 mm increments until the optimum height was reached. In such example, temperatures are approximate since they are measured a few seconds after power is disconnected from light engines. During test time of 2 hrs 50 min of temperature of unit-under-test, the optic under glass shield was 58° C., while the temperature of the glass shield itself was 76° C.

FIG. 2 also shows peripheral region 22 forming a shoulder 24 about hollow 29. FIGS. 1 and 2 show one example of spacer 70 being a sleeve 71 over fastener shank 61. Spacer 71 is shown to extend from one end 711 at transparent sheet 31 to an opposite end 712 against shoulder 24.

FIG. 2 further shows light-emitting arrangement 10 including an annular gasket 15 at transparent sheet 31. In the example illustrated in FIG. 2, annular gasket 15 is positioned between transparent sheet 31 and corresponding end 711 of sleeve 70.

Planar transparent sheet 31, as illustrated in FIG. 2, defines a recess 35 about fastener-receiving aperture 32 at the inward surface 36 of sheet 31. Sleeve 71 shown in FIG. 2 has a neck portion 713 with an outer dimension corresponding to the inner size of recess 35. In assembly, neck portion 713 of sleeve spacer 71 may be fitted into inward recess 35 of sheet 31 prior to insertion of fastener 60 to facilitate securement of light-transmitting shield member 30 to optical member 20.

Figure 4:
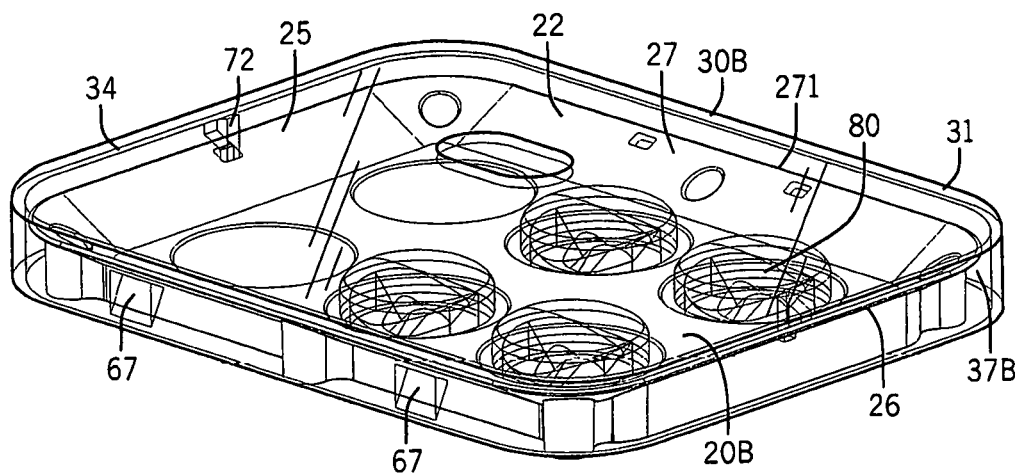
FIG. 4 is a schematic perspective view of another exemplary embodiment of a light-emitting arrangement according to the present invention.
Figure 12:
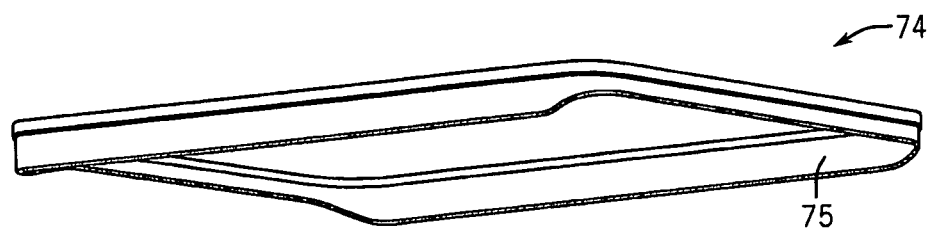
FIG. 12 is a perspective view of the opaque shield member of FIG. 11.
Figure 6:
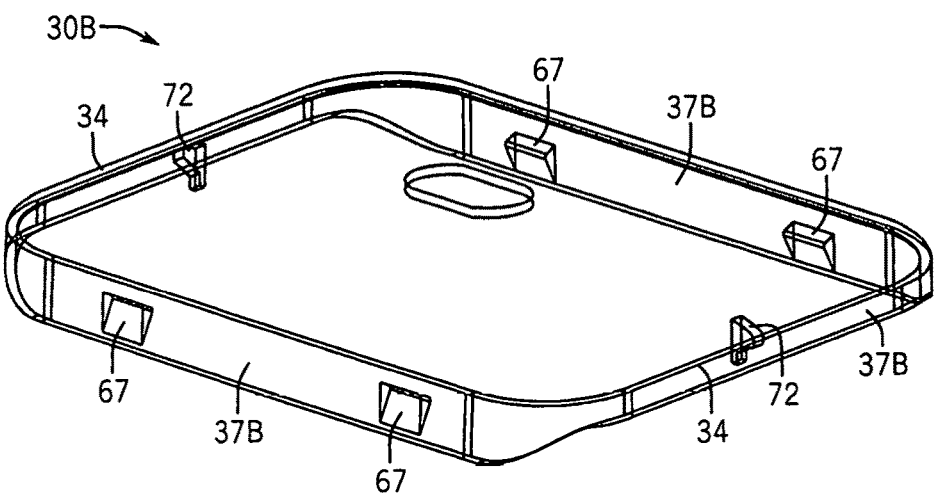
FIG. 6 is a perspective view of an example of a light-transmissive shield member of the light-emitting arrangement of FIG. 4.

FIGS. 4 and 6 show another example of spacer 70 being in the form of molded parts 72 on inside corners 34 of shield 30B. FIG. 4 shows spacers 72 positioned against a surface of front side 25 of peripheral region 22.

FIGS. 4-9, 22-27 and 29-33 show light-transmissive shield member 30 including lateral members 37 extending from substantially planar transparent sheet 30.

Figure 5:
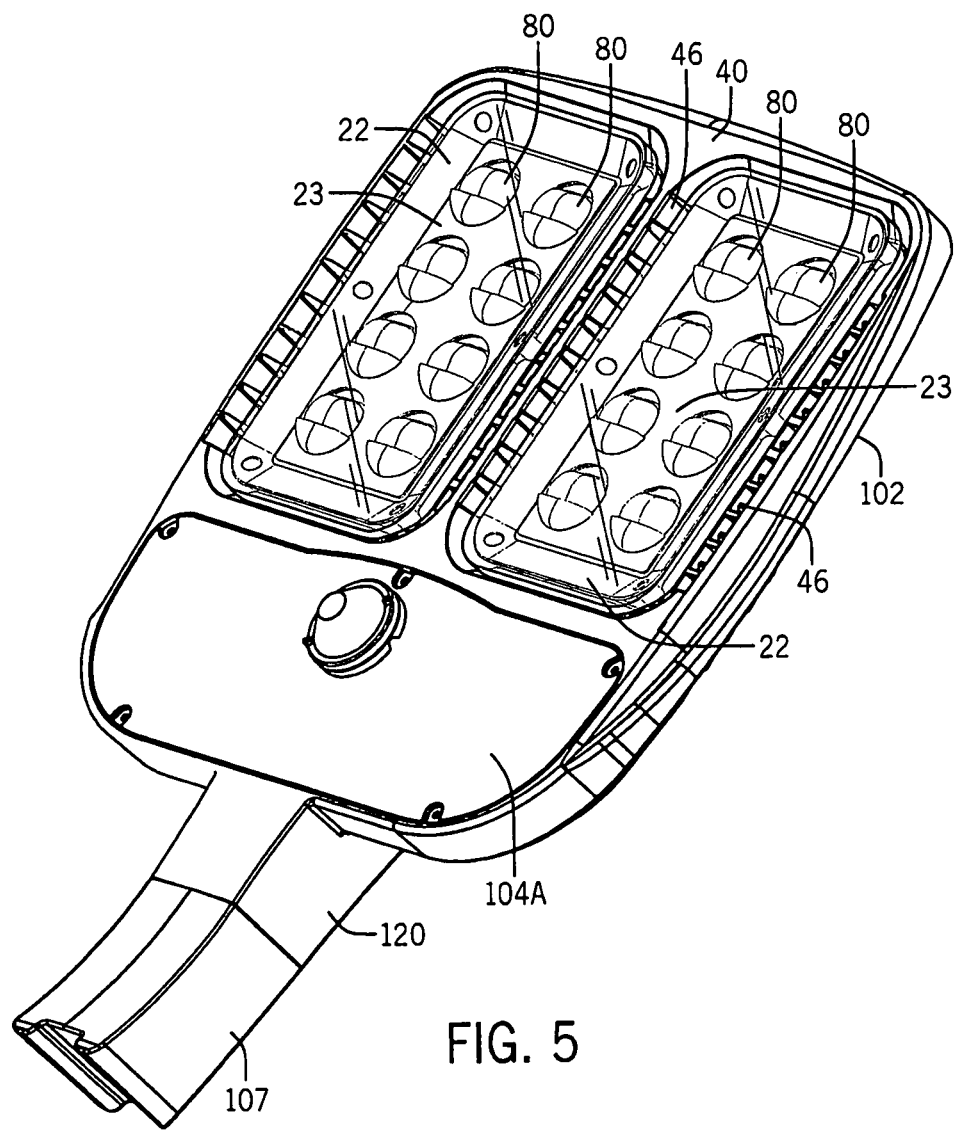
FIG. 5 is a perspective view of an exemplary LED light fixture with the light-emitting arrangement of FIG. 4.

FIG. 4 shows lateral members 37B engaging back side 26 of peripheral region 22, thereby securing shield member 30B to optical member 20. FIGS. 4-6 show light-transmissive shield member 30B as one piece with lateral members 37B being walls extending from planar transparent sheet 31 and enveloping optical member 20. FIGS. 4 and 6 also show lateral members 37B having inward protrusions 67 configured for snap engagement with peripheral region 22 of optical member 20. FIG. 4 illustrates such snap engagement being by the lateral members extending over and under an edge 271 of flange 27.

FIGS. 4 and 6 also show light-transmissive shield member 30B as including spacer 72 on inside corners 34 of one-piece shield member 30B for positioning against the surface of front side 25 of peripheral region 22. Spacer 72 is shown as part of one-piece shield 30B.

Figure 7:
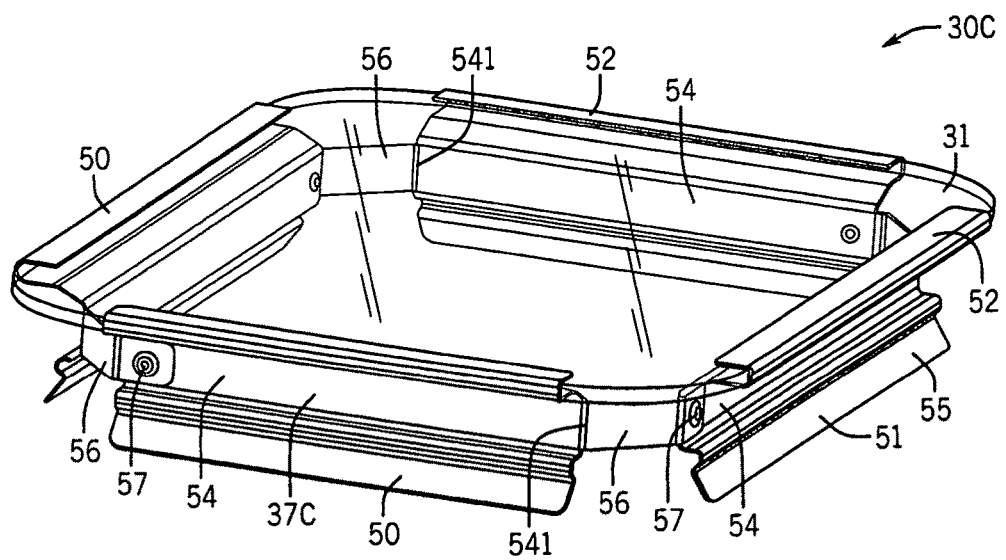
FIG. 7 is a perspective view of another example of a light-transmissive shield member.
Figure 8:
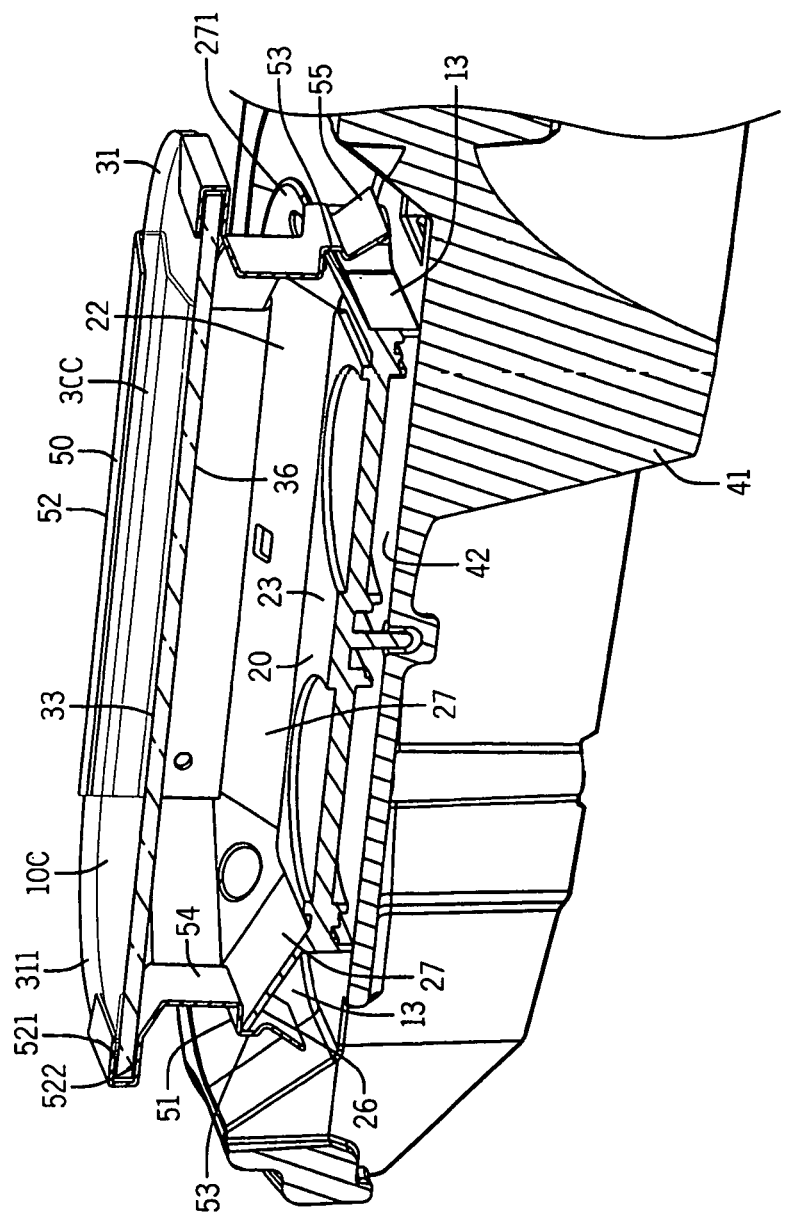
FIG. 8 is a schematic fragmentary cross-sectional view of another example of the light-emitting arrangement according to the present invention, including the light-transmissive shield member of FIG. 7.
Figure 9:
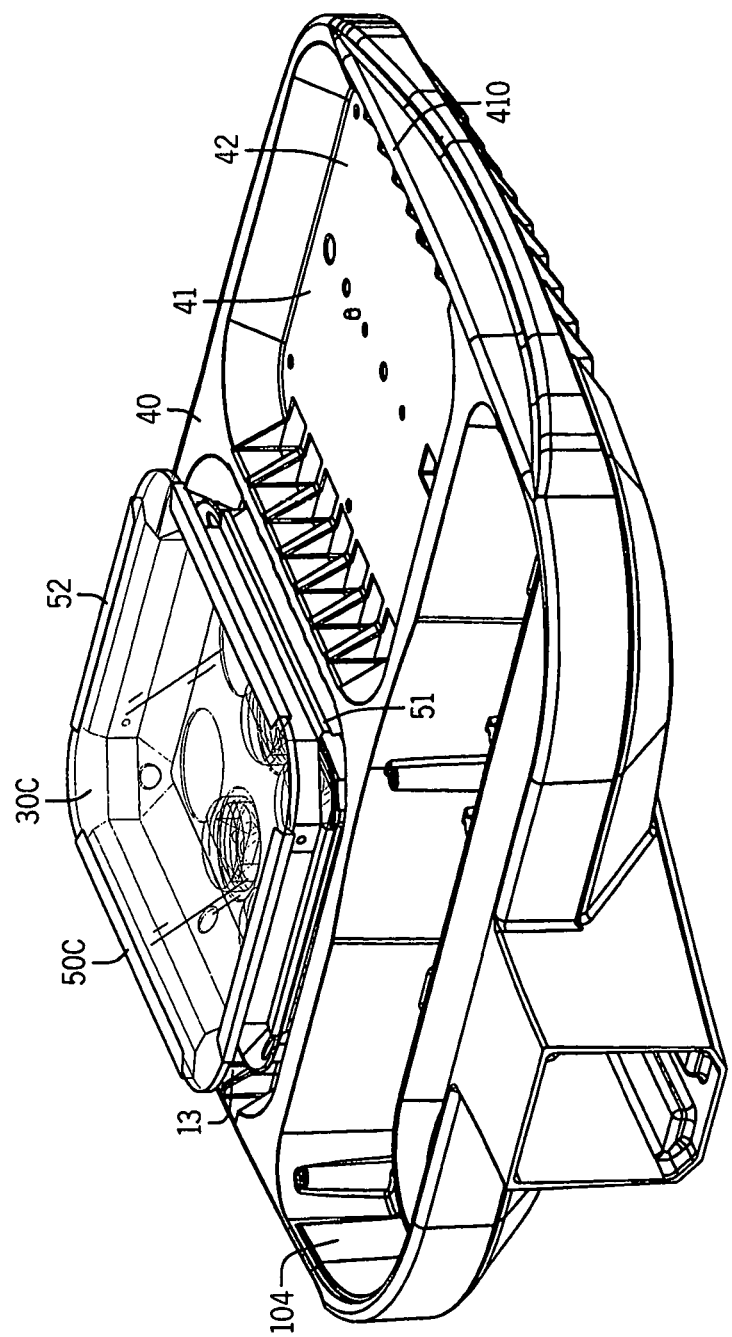
FIG. 9 is a schematic perspective view of the exemplary LED light fixture with the light-emitting arrangement of FIG. 8.

FIGS. 7-9 illustrate an embodiment of light-transmissive shield member 30C in which lateral members 37C include one or more mounting brackets 50 made of a suitable corrosion resistant material. Bracket 50 or collection of brackets extend from planar transparent sheet 31 to a retention portion 51 which engages peripheral region 22 of optical member 20. FIGS. 7-9 show an example of mounting bracket 50 which has a sheet-engaging portion 52 which fits over an edge region 311 of planar transparent sheet 31 such that surfaces 521 and 522 of sheet-engaging portion 52 are against each of inward surface 36 and outward surface 33 of sheet 31. The sheet-engaging portion may be made of spring steel or other suitable material providing resilience to the sheet-engaging portion allowing sandwiching and compression of sheet 31 between surfaces 521 and 522 of sheet-engaging portion 52 for secure holding of edge region 311 of planar transparent sheet 31.

FIGS. 8 and 9 also show retention portion 51 of each bracket 50 in snap engagement with optical member 20. FIG. 8 shows such engagement being a snap fit attachment of retention portion 51 to edge 271 of peripheral flange 27 of optical member 20 such that retention portion 51 engages back side 26 of peripheral flange 27 of optical member 20.

Retention bracket 50 shown in FIGS. 7-9 includes a leg portion 54 extending between sheet-engaging portion 52 and retention portion 51. Bracket 50 is shown terminating with a tab 55 extending from retention portion 51. Retention portion 51 is shown as forming a recess 53 accepting edge 271 of flange 27 of optical member 20. Tab 55 facilitates gripping and pulling of the retention portion 52 beyond peripheral-flange edge 271 during securement of bracket 50 to optical member 20.

FIG. 8 shows leg portions 54 determining the spacing between light distribution region 23 of optical member 20 and substantially planar transparent sheet 31. In other words, leg portions 54 are another example of a spacer.

It should be noted that each type of spacer 70, including bracket leg portions 54, fastener sleeve 71, molded inner-corner parts of one piece shield 30B, as well as other suitable structures that determine minimal spacing of the planar sheet 31 from light-distribution region 23, may be used alone or in combination with one or more of the other types.

FIGS. 7 and 9 show leg portion 54 extending along the entire perimeter 200 of optical member 20. In the example illustrated in FIGS. 7-9, the mounting bracket includes a plurality of brackets 50. Each of the plurality of brackets 50 is shown attached to a respective one of four straight edges 311 of planar transparent sheet 31. Brackets 50 are shown attached to each other by connectors 56 extending between brackets 50. Each bracket 50 is shown to have one connector 56 extending to adjacent bracket 50. FIG. 7 shows each connector 56 made as one piece with the respective bracket 50 from which such connector 56 extends and is secured to adjacent bracket 50 by fasteners 57. Connectors 56 extend from respective leg portion 54 and are secured to leg portion 54 of adjacent bracket 50. Each bracket 50 is shown as having one connector 56 extending from one lateral side 541 of respective leg portion 54 for securement to adjacent bracket 50 such that brackets 50 are connected in a daisy-chain-like manner.

Figure 32:
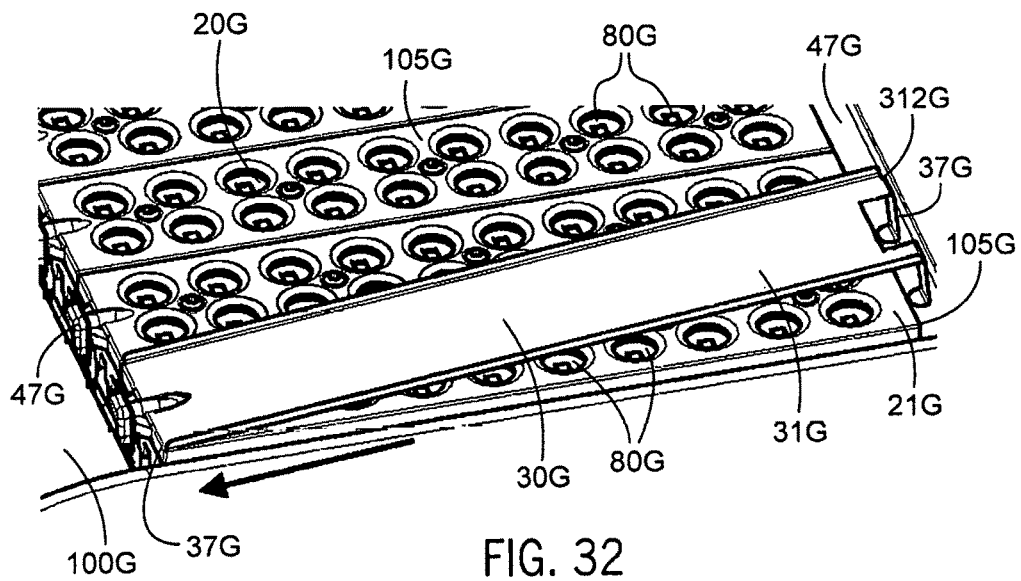
FIG. 32 is a fragmentary perspective view illustrating a process of securement of the light-transmissive shield member of FIG. 30 with respect to an exemplary optical member.
Figure 33:
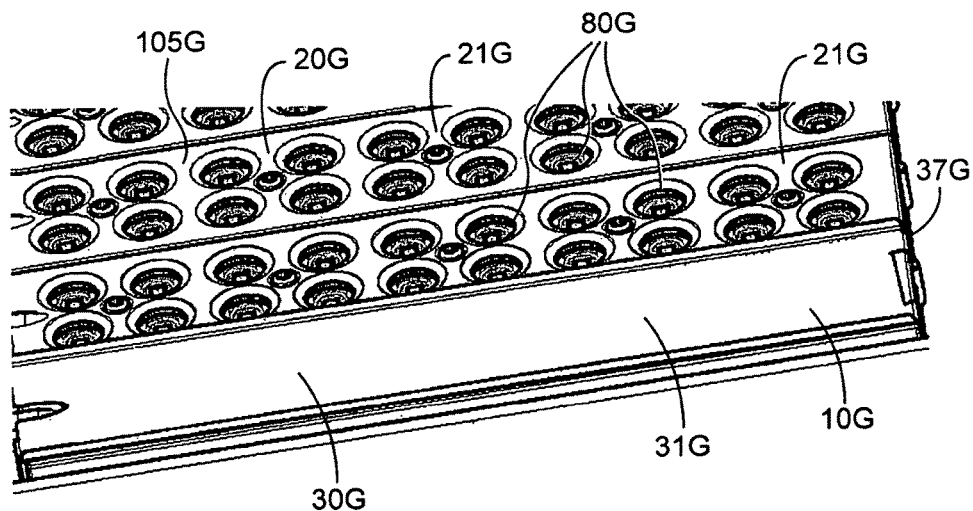
FIG. 33 is a fragmentary perspective view of the light-transmissive shield member of FIG. 30 secured to the optical member of FIG. 32.

FIGS. 30-33 show light-transmissive shield members 30G and 30G' having elongate configuration with lateral members 37G extending from shorter sides 312G of transparent sheet 31G and engaging lateral sides of LED module 105G which includes optical member 20G. In the example illustrated in FIGS. 32 and 33, optical member 20G includes carrier 21G in the form of a cover securing a plurality of lenses 80G each over a corresponding emitter. Emitters may be disposed on circuit board 12 secured to an emitter-supporting structure. FIGS. 32 and 33 show shield member 30G secured to module 105G by lateral members 37G in snap engagement with cover 21G.

FIGS. 17-22 and 26-29 illustrate examples of LED light fixture 100 having a frame 40 including emitter-supporting structures 41 and adjacent structures 43. Optical member 20 is shown disposed at emitter-supporting structures 41 and partially defining exterior 101 of light fixture 100. FIGS. 5, 9, 22, 26, 27, and 29-33 show light-transmissive shield member 30 secured with respect to optical member 20.

FIGS. 22-27 and 29-33 show light-transmissive shield member 30 including mounting members 38 which engage adjacent structures 43 to secure the corresponding shield member 30 with respect to optical member 20. In some examples, lateral members 37 may be mounting members 38. Alternatively or in addition, mounting members 38 may be part of lateral members 37 and/or include lateral members 37 along with other structural member(s).

Figure 25:
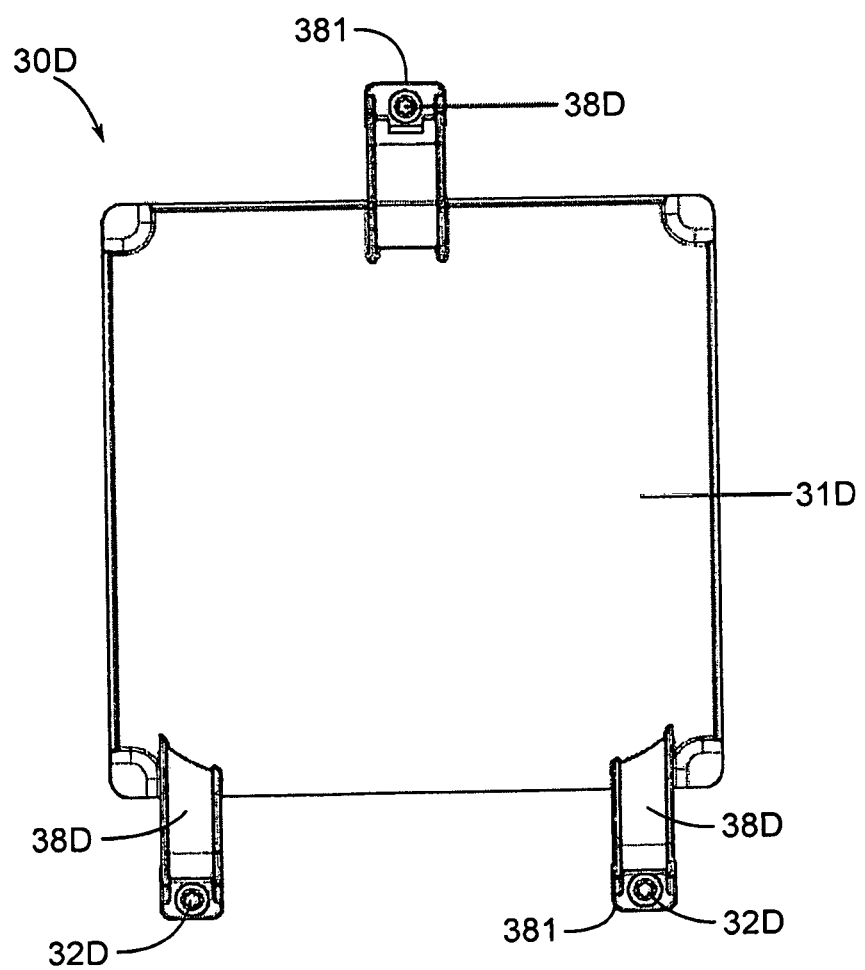
FIG. 25 is a plan view of another example of a light-transmissive shield member according to the present invention.
Figure 26:
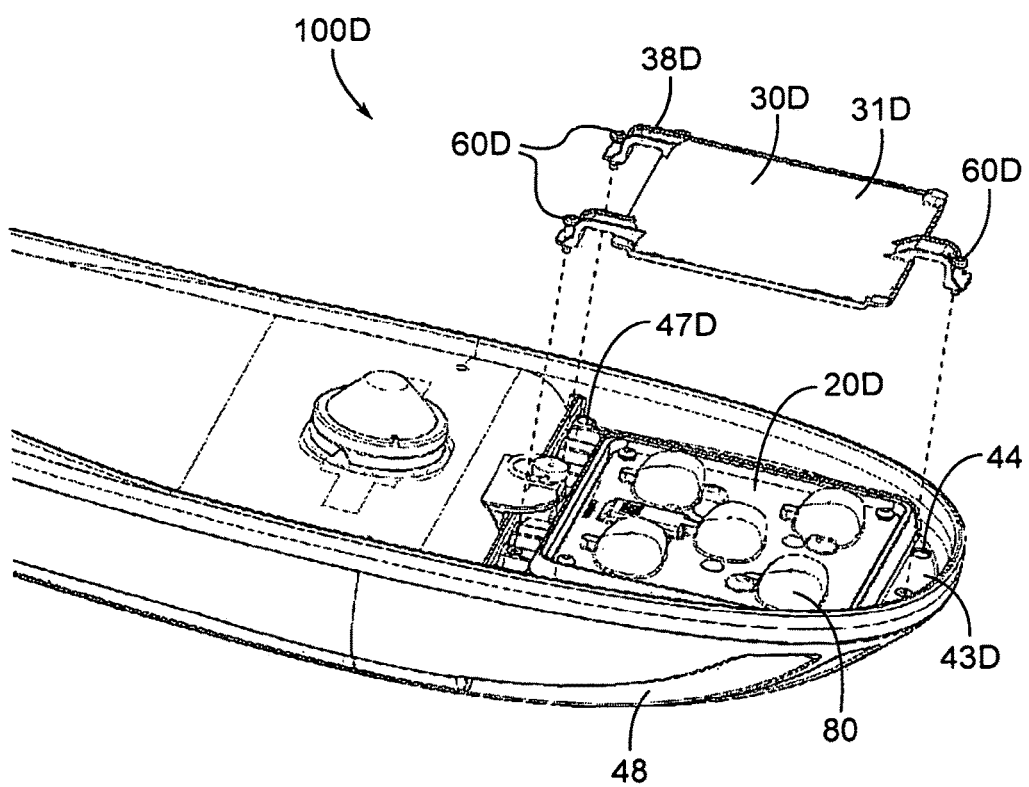
FIG. 26 is an exploded perspective view of the light-transmissive shield member of FIG. 25 being secured to yet another example of an LED light fixture.
Figure 27:
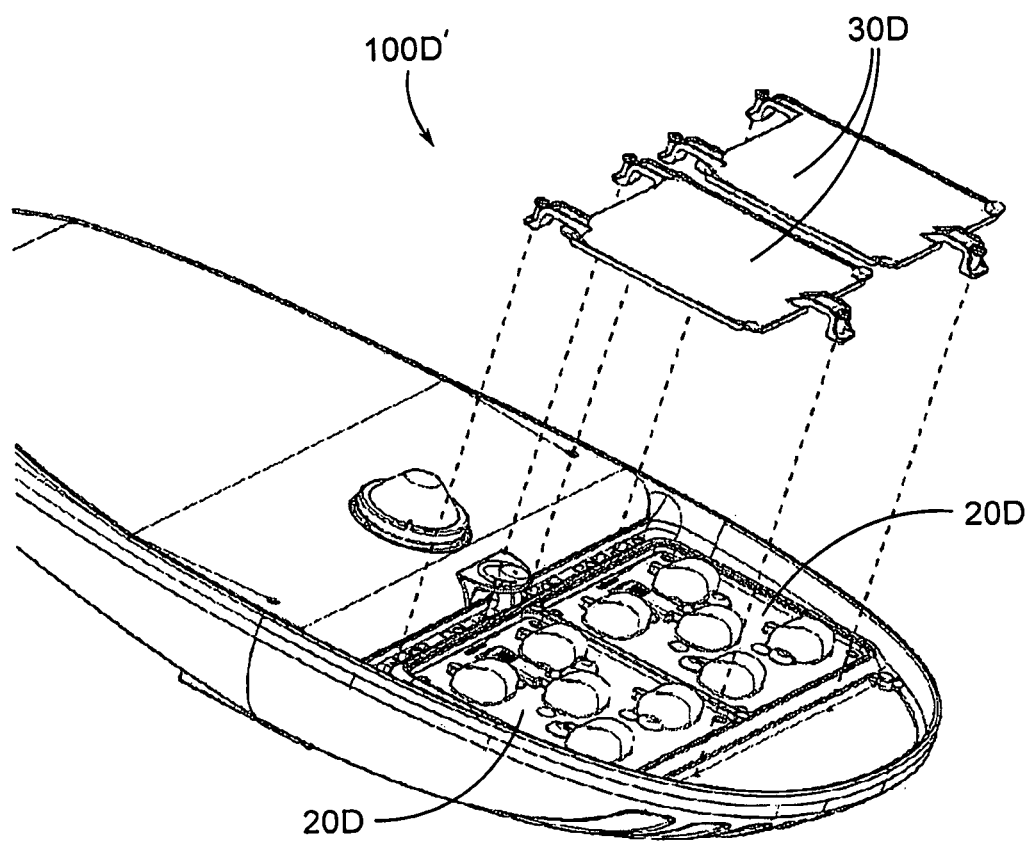
FIG. 27 is an exploded perspective view of a pair of the light-transmissive shield members of FIG. 25 being secured to another embodiment of the LED light fixture of FIG. 26.

FIGS. 25-27 illustrate an exemplary shield member 30D which is one-piece including substantially planar transparent sheet 31D and mounting member 38D extending from sheet 31D. Mounting members 38D include mounting aperture 32D at distal ends 381 of mounting members 38D. FIGS. 26 and 27 further show apertures 32D being aligned with a mounting hollow 44D defined by adjacent structure 43D for insertion of a suitable fastener 60D securing shield 30D with respect to optical member 20D.

Figure 24:
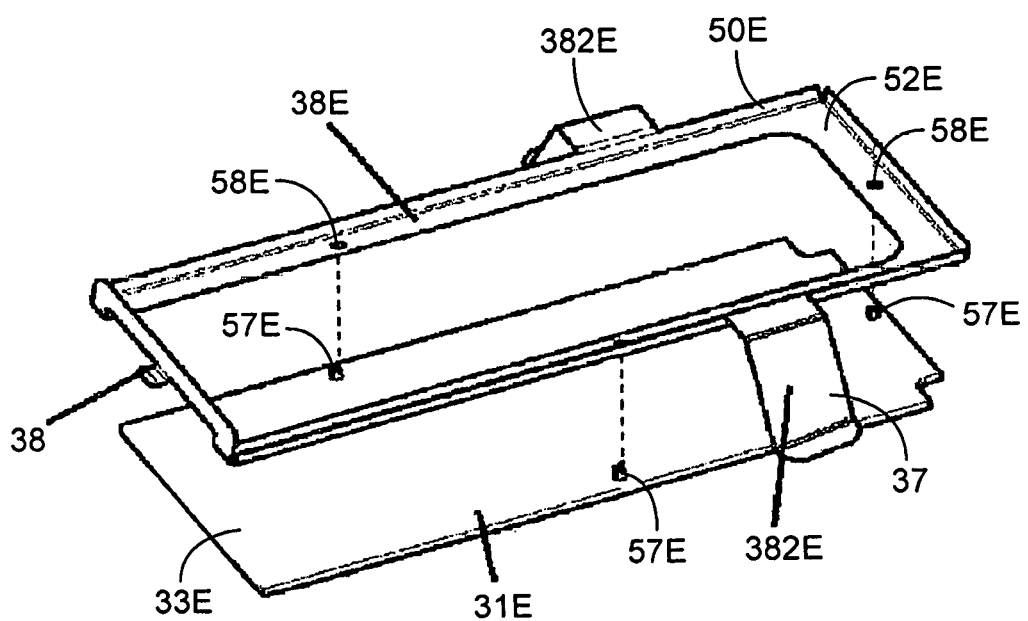
FIG. 24 is an exploded perspective view of the light-transmissive shield member of FIG. 23.

FIGS. 22-24 show light-transmissive shield 30E with mounting member 38E being a separate piece attached to substantially planar transparent sheet 31E. FIGS. 23 and 24 show mounting member 38E as a frame-shaped bracket 50E attached to substantially planar transparent sheet 31E. FIG. 24 shows frame 38E and sheet 31E being connected with an attachment arrangement including a hollow 58E defined by sheet-engaging portion 52E of bracket 50E to receive a pin 57E which extends from outward surface 33E of sheet 31E. Alternatively or in combination, in some embodiments, the attachment arrangement may have the pin extending from the sheet-engaging portion of the frame-shaped bracket for engagement with a hollow defined by the substantially planar sheet. For example, the bracket and the transparent sheet each may have both the pins and pin-receiving hollows being configured and positioned for engagement with the corresponding hollow or pin.

FIG. 22 shows frame-shaped bracket 50E extending over peripheral region 22E of optical member 20E with substantially planar transparent sheet 31E being disposed between frame-shaped bracket 50E and peripheral region 22E of optical member 20E.

FIGS. 19, 20 and 26-29 show adjacent structures 43 defining open spaces 46 permitting air and water flow through light fixture 100. Some examples of open spaces 46 include one or more venting apertures 47 formed by fixture frame 40 and fully surrounded by fixture frame 40. Adjacent structures 43 are shown to include heat-dissipating structures 48 configured for conducting heat away from heat sink region 410 of emitter-supporting structures 41.

FIGS. 19-22 and 26-29 show heat dissipating structures 48 including fins 480 extending across a respective venting aperture 47. FIGS. 32 and 33 show venting apertures 47G along each side of light-emitting arrangement 10G.

Figure 17:
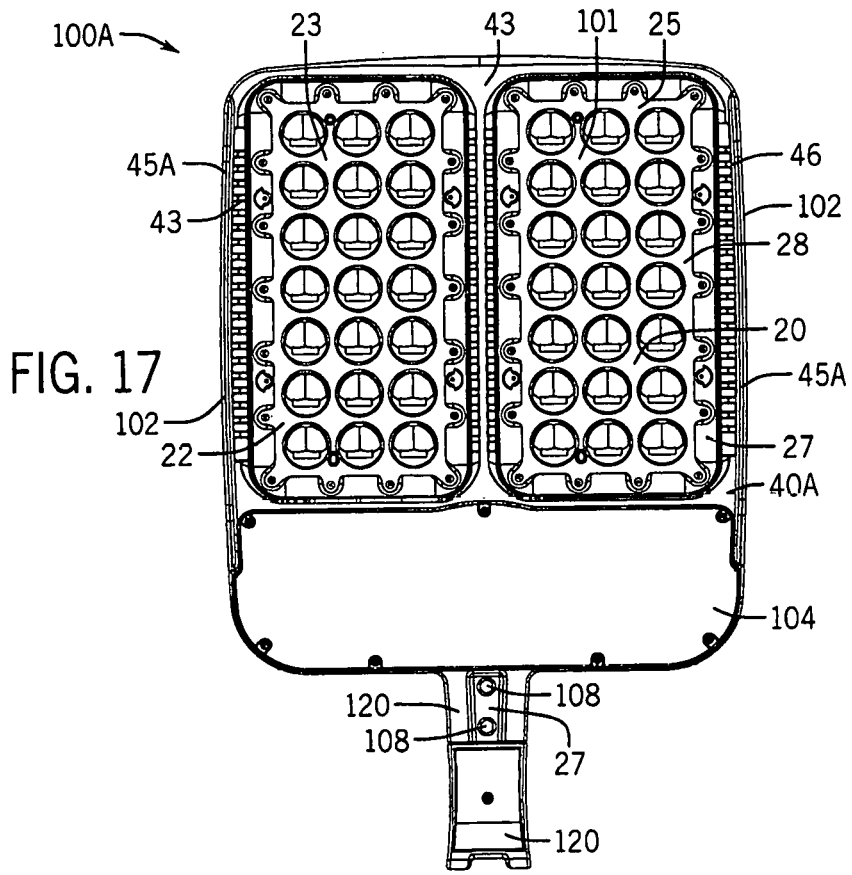
FIG. 17 is a light-emitting plan view of another example of an LED light fixture.
Figure 18:
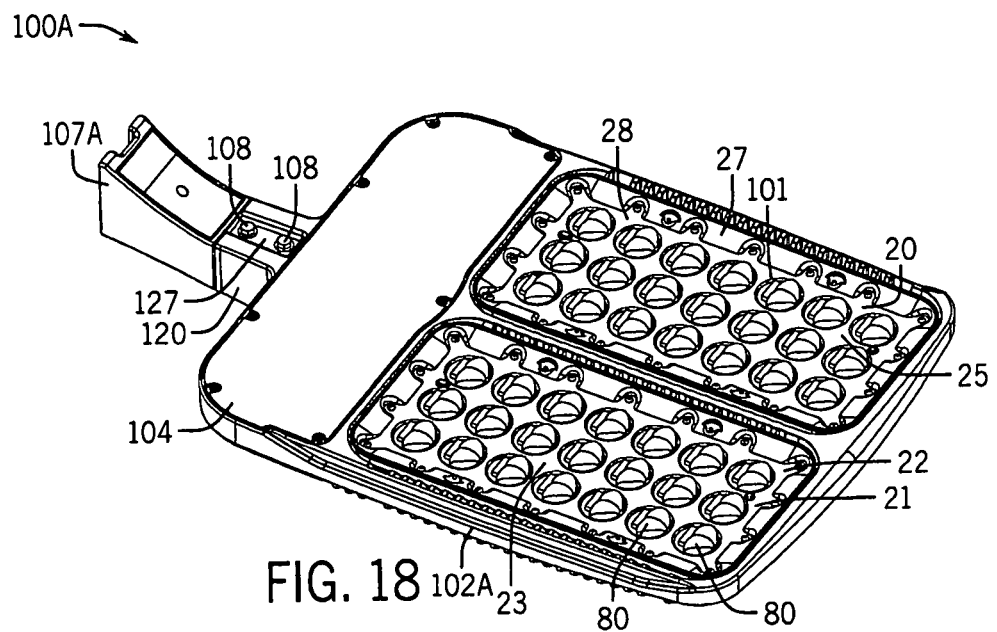
FIG. 18 is a perspective view of the light-emitting side of the LED light fixture of FIG. 17.
Figure 19:
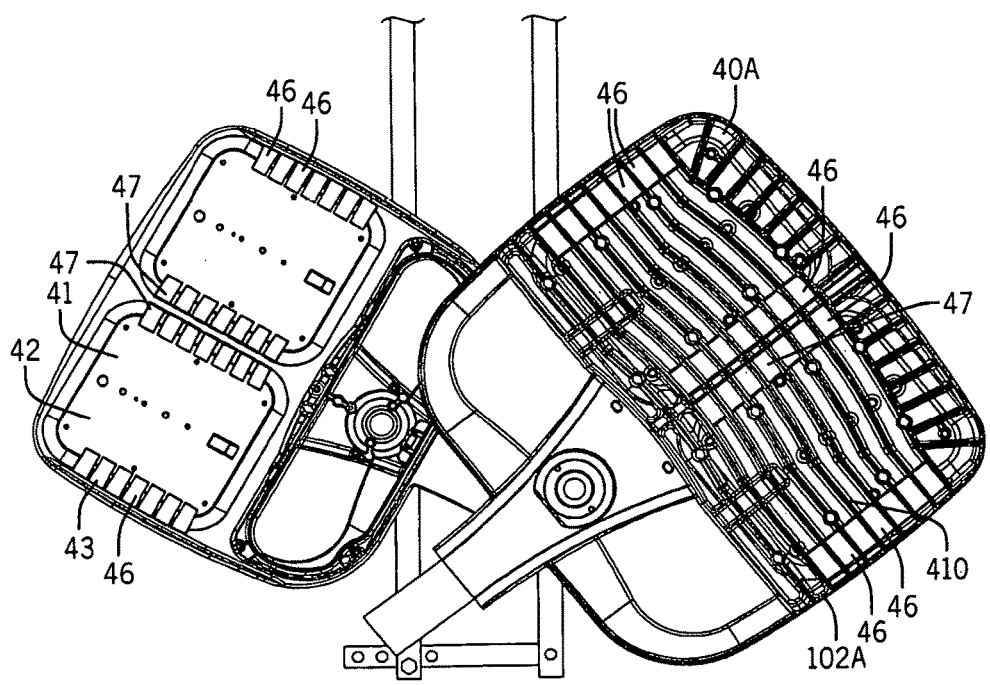
FIG. 19 is a schematic plan view illustrating examples of light-fixture open spaces.

FIGS. 17-19 show adjacent structures 43A including portions of fixture frame 40A which form one or more regions of an exterior profile 102A of fixture 100A and are fully exposed to the outside. FIGS. 17-19 show an example with adjacent structures 43A including lateral sides 45A of fixture frame 40A.

FIGS. 23 and 24 show an example of mounting member 38E including a pair of mounting arms 382E extending from opposite sides of light-transmissive shield member 30E in opposite directions away from each other. FIG. 22 shows mounting arms 382E extending into and through corresponding open spaces 46E such that distal end 381E of each mounting member 38E engages an opposite side 431 of adjacent structure 43E.

Figure 28:
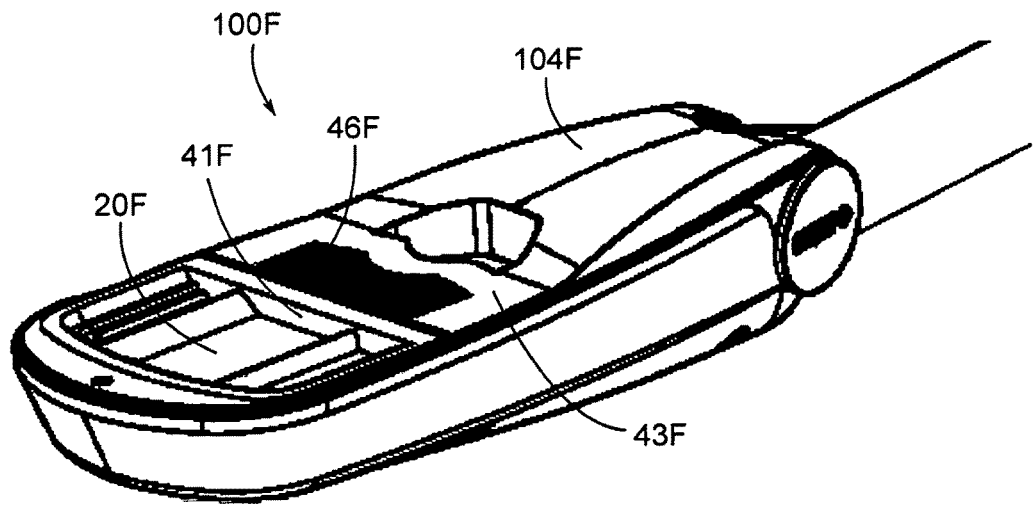
FIG. 28 is a perspective view of still another example of an LED light fixture.
Figure 44:
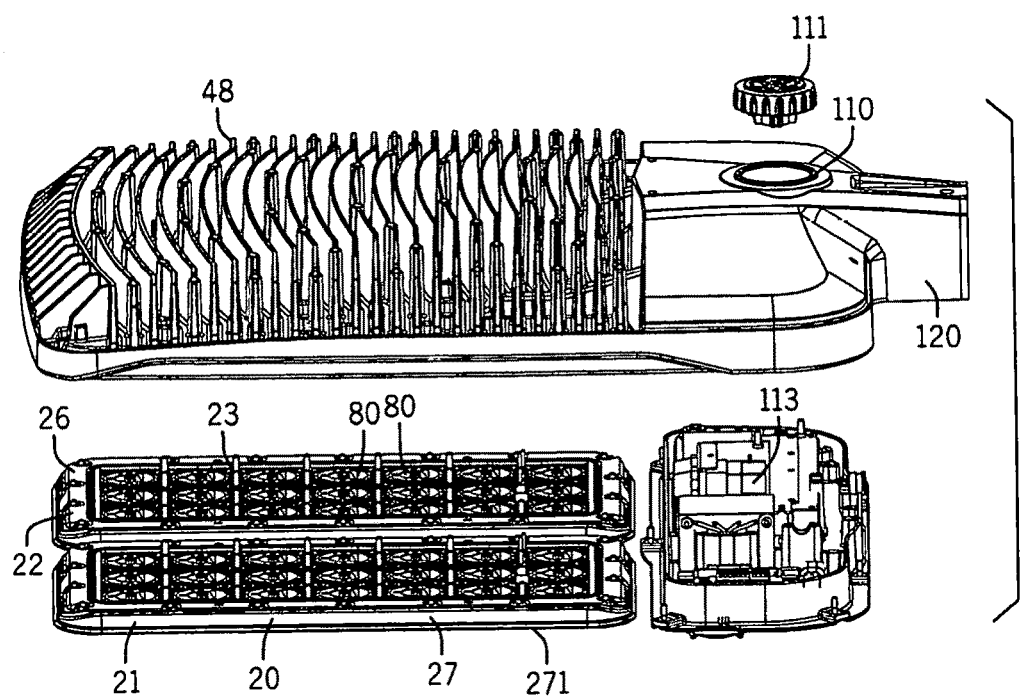
FIG. 44 is an exploded perspective view of the LED light fixture of FIG. 38.

FIG. 28 shows light fixture 100F with optical member 20F extending from emitter-supporting structure 41F with adjacent structure 43F extending between emitter-supporting structure 41F and an enclosure 104F forming a substantially closed chamber enclosing power-circuitry components 113 (seen in FIG. 44). Adjacent structure 43F defines open space 46F permitting fluid flow through fixture 100F between the chamber and emitter-supporting structure 41F. Heat-sink fins 480F extend across open space 46F.

Figure 29:
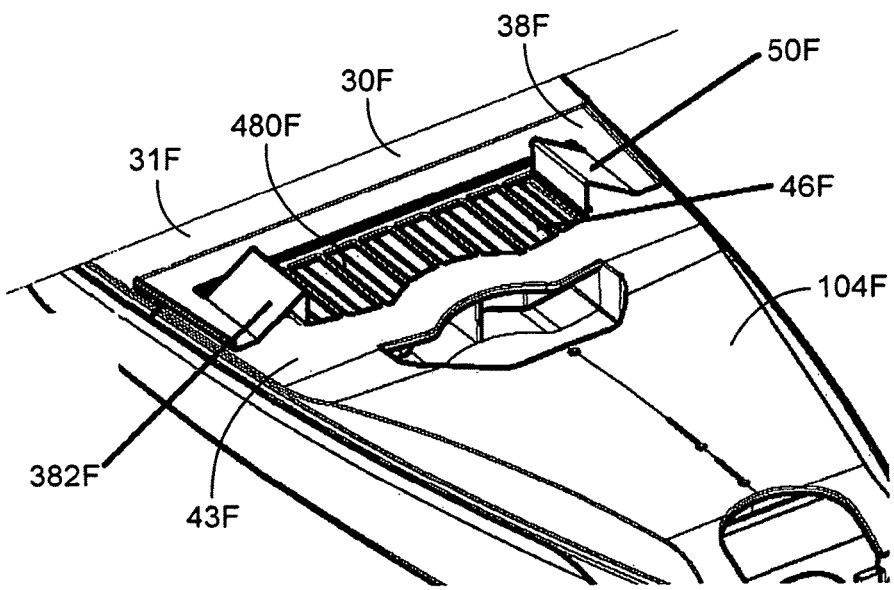
FIG. 29 is a fragmentary perspective view of the LED light fixture of FIG. 28 illustrating securement of a light-transmissive shield member according to the present invention.
Figure 30:
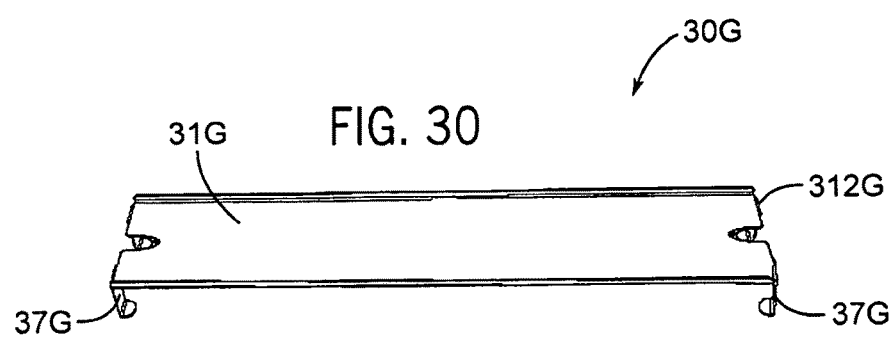
FIG. 30 is a perspective view of still another example of a light-transmissive shield member according to the present invention.
Figure 31:
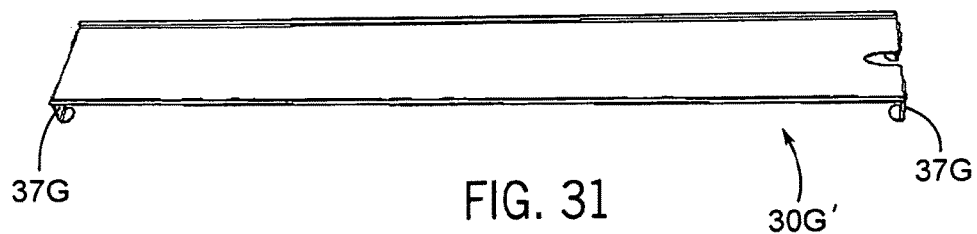
FIG. 31 is a larger embodiment of the light-transmissive shield member of FIG. 30.

FIG. 29 shows mounting member 38F including a pair of mounting arms 382F extending from mounting member 38F toward each other. Mounting member 38F securing shield 30F with respect to optical member 20F with mounting arms 382F extends into open space 46F and engages corresponding fins 480F of heat-dissipating structure 48F.

FIGS. 11-14 illustrate an example of an opaque shield 74 disposed along perimeter 200 of optical member 20A. Shield member 74 is configured and dimensioned to minimize or block illumination in a direction which is opposite the direction of the primary illumination. Experimental testing performed with light fixtures positioned for downward illumination showed that lateral shielding may facilitate blocking of upward illumination. This facilitates compliance with "dark-sky" requirements for limiting light pollution. FIGS. 11-14 show opaque shield 74 as one piece shaped to extend along perimeter 200 of optical member 20 to facilitate interception of light that escapes beyond edge 271 of optical-member peripheral region 22 in undesired directions. While the illustrated opaque shield extends along the entire perimeter 200, some alternative examples may be configured to extend only along a portion of the edge 271. In certain situations, more than one shield may be utilized in combination to further facilitate blocking of light in one particular direction. Shield 74 is shown to extend beyond edge 271 for a common distance along all sides of optical member. In certain embodiments, the opaque shield may be configured to have varying size such that along one side of the optical member the shield extends beyond edge 271 for a distance that is greater that the distance to which the shield extends beyond edge 271 along a different side of the optical member. Depending on the circumstances, some embodiments of the light-emitting arrangement may utilize a single shield of uniform or varying dimensions or have a combination of the shield with uniform dimensions and the shield with varying dimensions or a shield extending only along a portion of perimeter 200.

Shield 74 may be made of a suitable opaque material, including various polymers and metals. An inward surface 75 of opaque shield 74 may be reflective either by the nature of the shield material or by having a reflective coating.

Figure 14A:
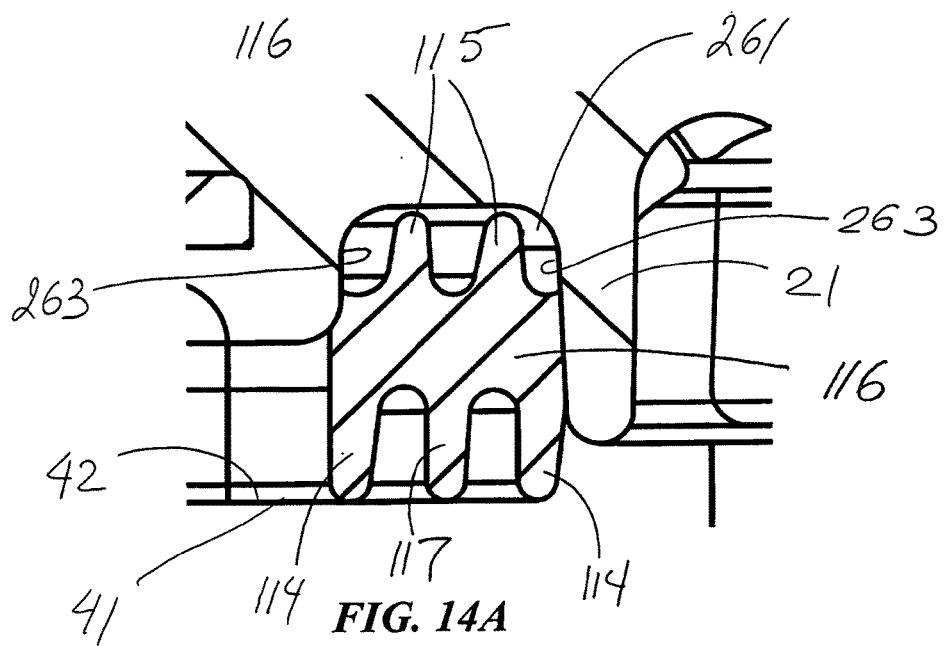
FIG. 14A is an enlarged fragment of cross-sectional view of FIG. 14 illustrating details of the gasket.
Figure 14:
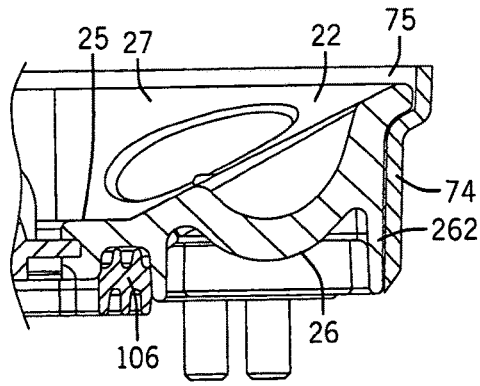
FIG. 14 is an elevation fragmentary cross-sectional view illustrating details of the cross-sectional view of FIG. 11.
Figure 15:
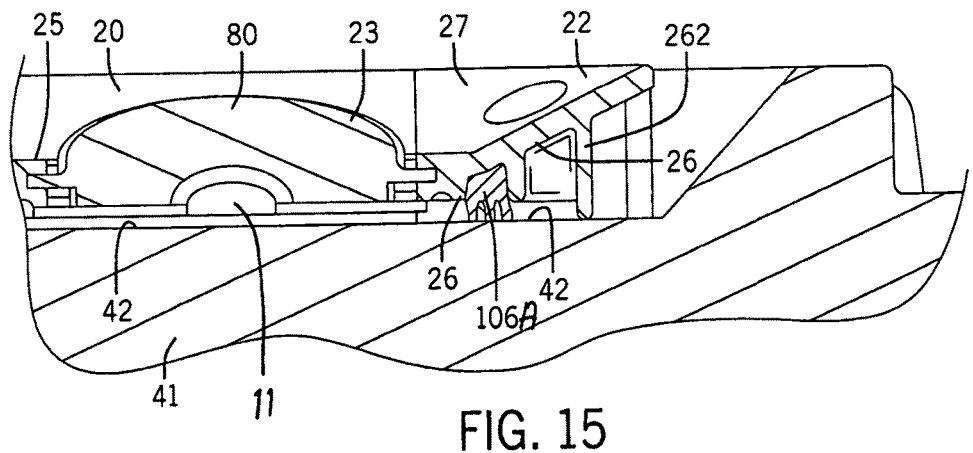
FIG. 15 is a fragmentary cross-sectional view illustrating details of another example of the LED light fixture including an optical member over an LED light source on an emitter-supporting structure.
Figure 16:
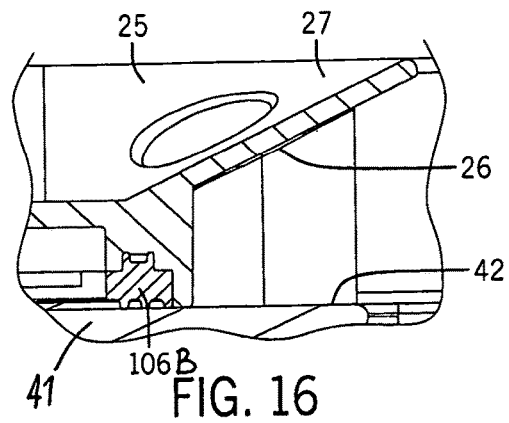
FIG. 16 is a fragmentary cross-sectional view of yet another example of an optical member disposed over an LED light source.

FIGS. 14-16 also show back side 26 of optical-member carrier 21 forming a recess 261 receiving a gasket 106 which encircles circuit board 12 to provide weatherproofing for emitters 11 on circuit board 12.

Figure 2A:
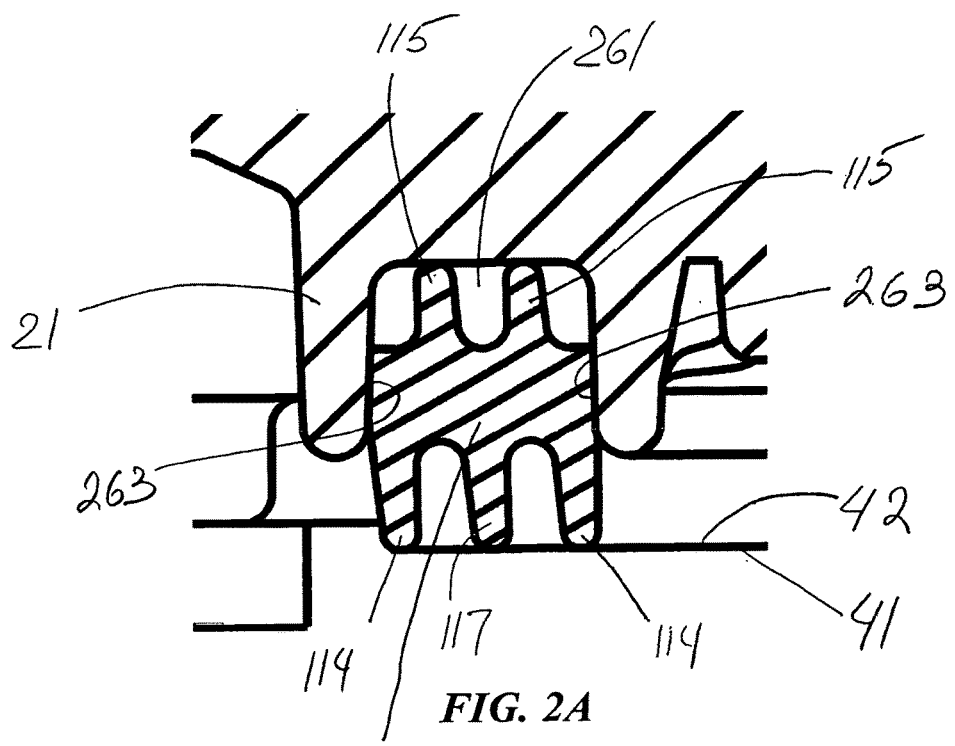
FIG. 2A is an enlarged fragment of cross-sectional view of FIG. 2 illustrating details of the gasket.

FIGS. 2A and 14A illustrate an example of an improved gasket 106. In the illustrated example, gasket 106 has a pair of spaced apart lateral fingers 114 and a pair of spaced apart inner fingers 115. Inner fingers 115 are each offset from corresponding lateral side 263 of recess 261 and offset with respect to lateral fingers 114. Lateral fingers 114 engage lateral sides 263 of recess 261 and extend outwardly from recess 261. Gasket 106 is also shown to have gasket body 116 with inner fingers 115 and lateral fingers 114 extending form gasket body 116 away from each other such that gasket body 116 is between lateral and inner fingers 114 and 115. Gasket 106 is shown as including a middle finger 117 extending outwardly from gasket body 116 between lateral fingers 114.

In some examples, gasket 106 is of molded silicone which has nominal thickness of about 2 mm which provides higher compression as compared to other gasket configurations. For example, the gasket illustrated in FIG. 14 has about 60% more compression (1.02 mm) than (0.635 mm) of exemplary gaskets 106A and 106B illustrated in FIGS. 15 and 16. Longer fingers and greater nominal thickness of gasket 106 provide a higher degree of interference against material displacement and greater protection against water leakage through such gasket.

FIGS. 14 and 15 show peripheral region 22 of carrier 21 having a wall 262 between back side 26 of carrier 21 and emitter-supporting surface 42. Wall 262 is shown extending from back side 26 of carrier peripheral region 22 and dimensioned to contact or otherwise engage emitter-supporting structure 41 to facilitate blocking of water ingress along emitter-supporting surface toward gasket 106.

FIG. 14 also shows opaque shield 74 being configured to extend along wall 262. In the illustrated embodiment, opaque shield 74 is dimensioned to extend from positions at the emitter-supporting structure. Such dimensioning of the opaque shield may further facilitate blocking of water ingress along emitter-supporting surface from reaching the gasket and thus weatherproof sealing of the circuit board.

Figure 39:
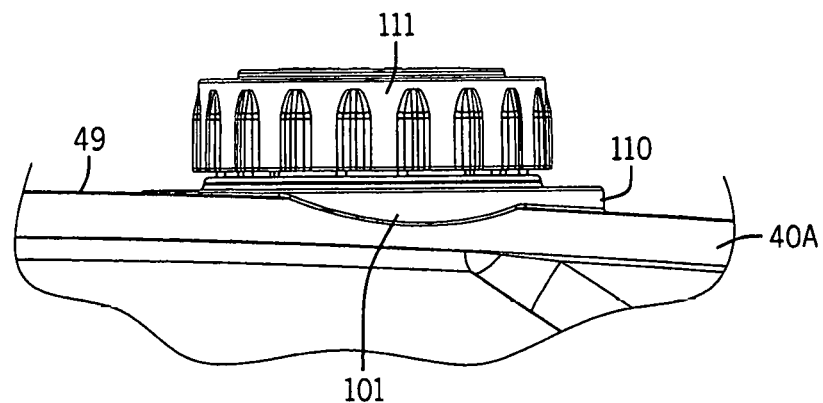
FIG. 39 is a fragmentary view of a sensor arrangement for LED light fixtures.
Figure 40:
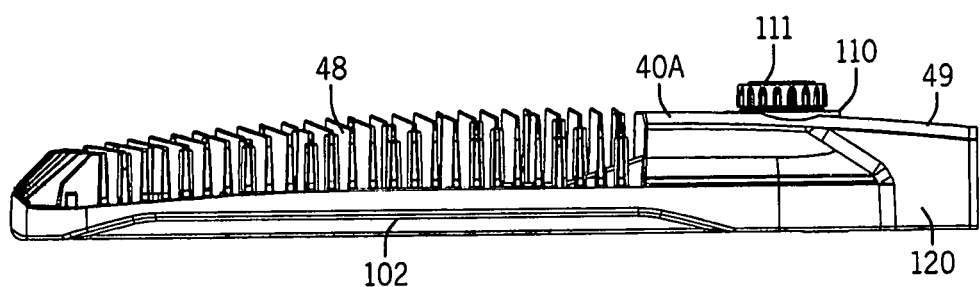
FIG. 40 is a lateral elevation of the light fixture of FIG. 38.
Figure 41:
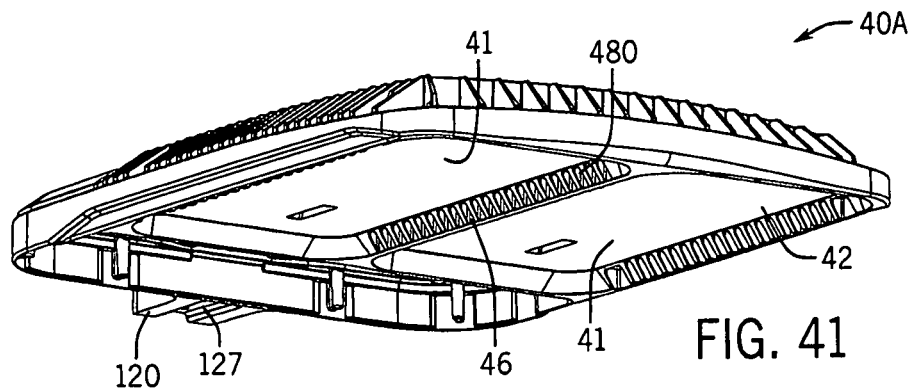
FIG. 41 is a perspective view from the light-emitting side of a frame of the LED light fixture of FIG. 38.
Figure 42:
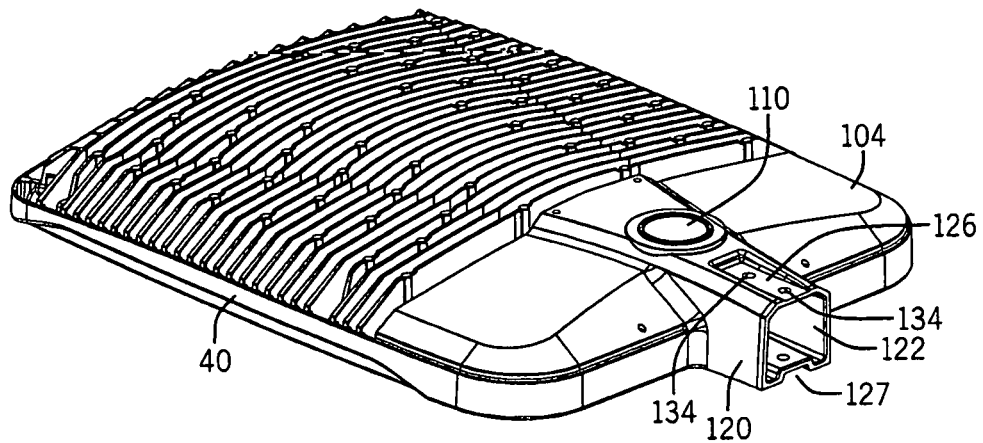
FIG. 42 is a rear perspective view from the opposite side of the frame of FIG. 41.
Figure 43:
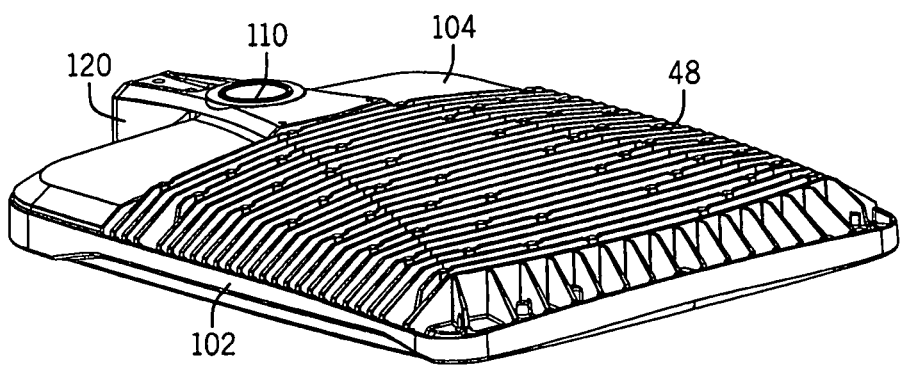
FIG. 43 is a front perspective view from the opposite side of the frame of FIG. 41.

FIG. 39 shows a fixture exterior portion 110 forming a base for a light sensor 111. Light sensor 111 may be of the type described in co-owned application Ser. Nos. 14/209, 390 and 29/484,879 both filed Mar. 13, 2014 and D750,314, filed Dec. 22, 2014, the entire contents of these three applications being incorporated herein by reference.

FIGS. 38-40 and 48 show base 110 protruding from an exterior surface 49 of fixture exterior 101 such that, in light fixtures oriented with light sensor 111 being on top, water drains away from light sensor 111 and does not pool in area 110 surrounding light sensor 111 or leak, causing interference with the functioning of sensor 111 or the electronic components of fixture 100.

FIGS. 34-37 illustrate an exemplary lens 80A having an inner refracting surface 81 defining a light-receiving cavity 82 with an opening 821 in an emitter-adjacent plane 83. A reflecting surface 84 is shown extending from emitter-adjacent plane 83 offset from inner refracting surface 81 and partially defining a rear cavity 842. Reflecting surface 84 is positioned to receive rearward light that passed through inner surface 81 and configured to reflect such rearward light through total internal reflection (TIR) toward primarily forward direction 4.

Figure 35:
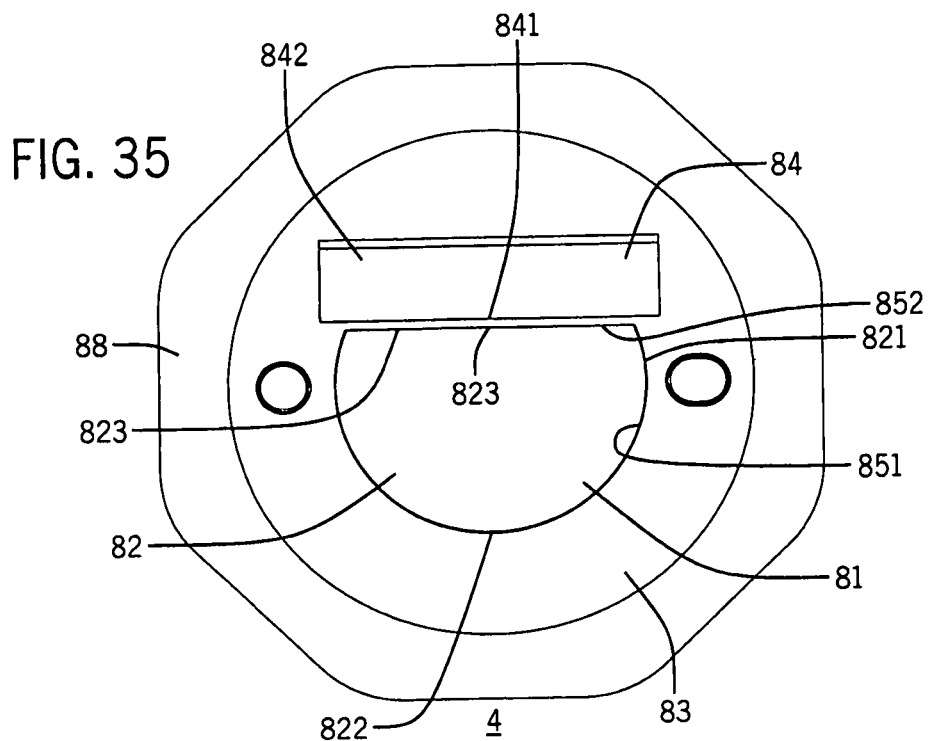
FIG. 35 is a plan view of an inner surface of the lens of FIG. 34.

FIG. 35 shows inner-cavity opening 821 having a circular forward region 822 adjoined by a substantially straight rear region 823. Forward region 822 is shown as a circular arc extending around an emitter axis 11' for an angle greater than 180°. Substantially straight rear region 823 is shown extending substantially orthogonally to a front-to-back line 5.

FIG. 35 also shows reflecting surface 84 extending from a substantially straight line 841 in emitter-adjacent plane 83. Line 841 is shown extending substantially orthogonally to front-to-back line 5. Line 841 is shown rearwardly offset from inner-cavity opening 821 and being substantially parallel to rear region 823 of inner-cavity opening 821.

Figure 36:
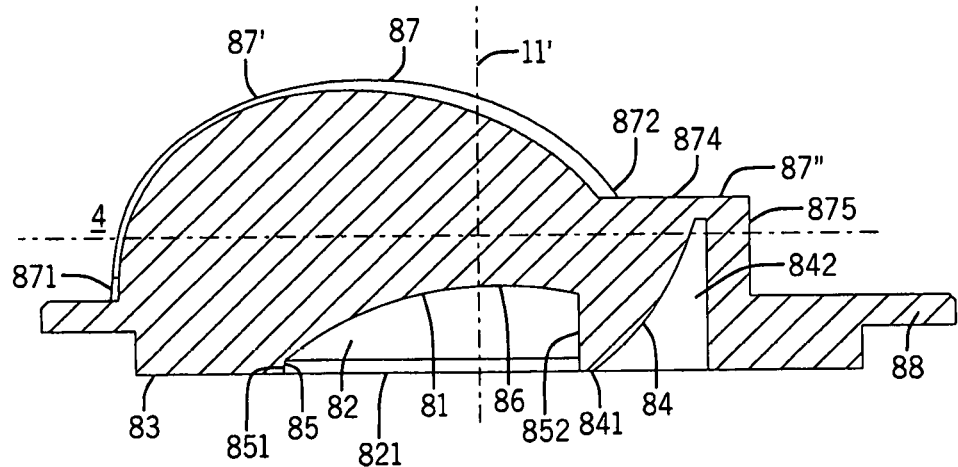
FIG. 36 is a front-to-back cross-section of the lens of FIG. 34.
Figure 37:
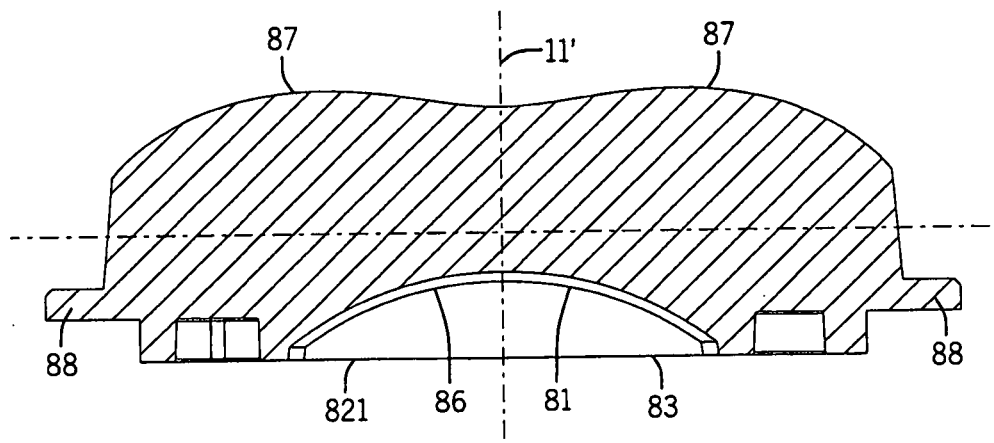
FIG. 37 is a side-to-side cross-section of the lens of FIG. 34.
Figure 38:
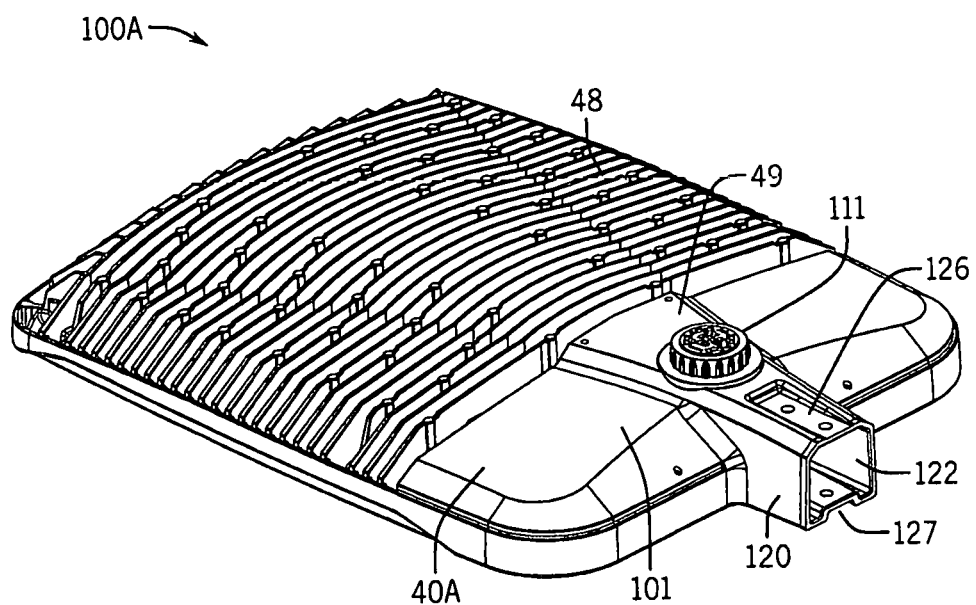
FIG. 38 is a perspective view from a side opposite the light-emitting side of the LED light fixture of FIG. 17.

FIGS. 36 and 37 show inner surface 81 having a base-adjacent surface portion 85 extending from cavity opening 821 substantially orthogonally to emitter-adjacent plane 83. Along forward region 822 of cavity opening 821, base-adjacent inner surface portion 85 has a partially-cylindrical front portion 851 adjoined by a substantially planar rear portion 852 along rear region 823 of inner-cavity opening 821. Base-adjacent inner surface portion 85 is also shown to have rear positions along rear portion 852 which are farther from emitter-adjacent plane 83 than front positions along front portion 851.

FIGS. 36 and 37 further show inner surface 81 having an innermost end surface portion 86 which is shown concave. End surface portion 86 is also shown to form a partial dome-like shape truncated by substantially planar rear portion 852 of base-adjacent surface portion 85. The innermost end surface portion 86 is shown to be farthest from emitter-adjacent plane 83 on emitter axis 11' and to extend from emitter axis 11' toward emitter-adjacent plane 83 to adjoin base-adjacent inner surface portion 85.

Figure 34:
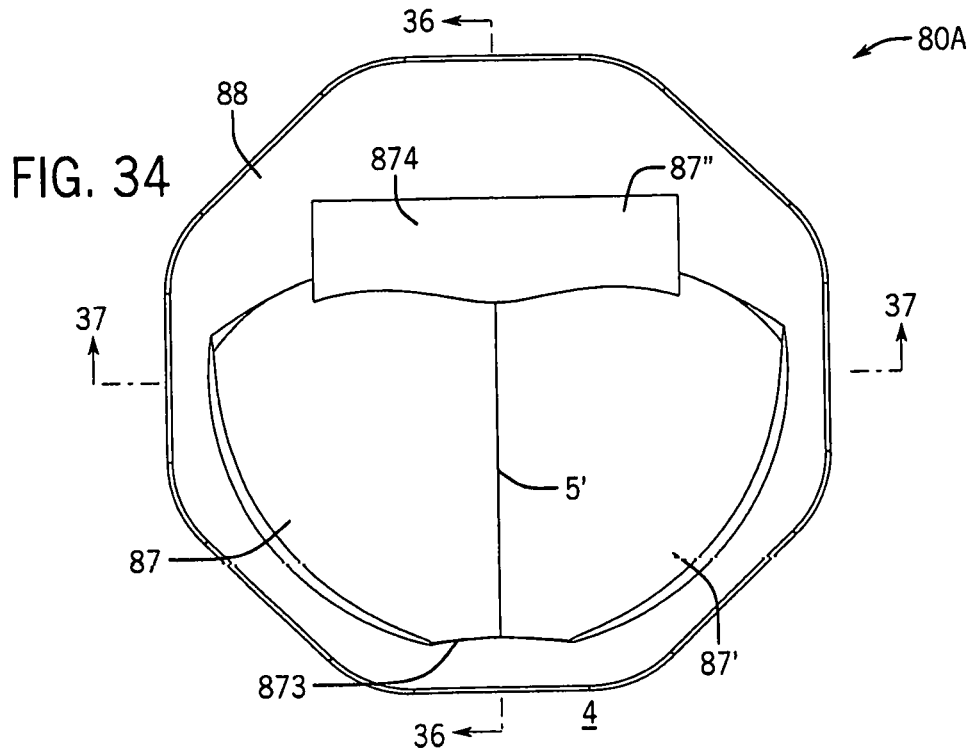
FIG. 34 is a plan view of a light-output surface of an exemplary lens for an optical member.

FIGS. 34, 36 and 37 show lens 80A having an outer surface 87. Outer surface 87 is shown extending from front positions 871 which are forward of inner-cavity opening 821 and are farther from emitter-adjacent plane 83 than either of innermost front positions of front portion 851 of base-adjacent inner surface portion 85 and the front position of end surface portion 86. Outer surface 87 is shown to have a front portion 87' terminating at rear positions 872 which are farther from emitter-adjacent plane 83 than innermost positions of reflecting surface 84 which are farther from emitter-adjacent plane 83 than innermost positions of inner-surface innermost end surface portion 86. Rear positions 872 of front portion 87' are also shown to be at such distance along front-to-back line 5 which is farther from emitter axis 11' than inner-surface rear portion 852 and is at the same distance or closer to emitter axis 11' than reflecting-surface base line 841.

FIGS. 34 and 37 show that front positions 871 of outer-surface front portion 87' have an inward front recess 873 which interrupts the smooth convex configuration of forwardmost front positions 871 of outer-surface front portion 87'. It is also shown in FIGS. 34 and 37 that outer-surface front portion 87' has a concavity between a pair of primarily convex portions. FIG. 37 shows the concavity extending along front-to-back line 5 and including emitter axis 11'.

FIGS. 34 and 36 show outer surface 87 having rear outer surface portion 87" extending rearwardly from front portion 87". Rear outer surface portion 87" is shown to extend primarily over rear cavity 842 and have a substantially planar surface portion 874 which is shown substantially parallel to emitter-adjacent plane 83. Rear outer surface portion 87" is shown to terminate rearwardly with a rearmost portion 875 which extends from planar surface portion 874 toward emitter-adjacent plane 83. FIGS. 34 and 36 show rearmost portion 875 being substantially orthogonal to plane 83 and substantially parallel to emitter axis 11'.

FIGS. 34-37 further show lens 80A having a flange 88 which extends outwardly from outer surface 87. Flange 88 may be configured for overmolding during formation of carrier 21 in multi-lens optical member 20.

The described features of the exemplary lens 80 are illustrated as utilized together in the same lens 80A. It should be appreciated that each of the described features can be used in other lenses by itself without other features of illustrated lens 80A or in combination with fewer than all features of illustrated lens 80A. For example, the discussed configuration of inner surface 81 may be used in lenses with or without described reflecting surface 84 or with a reflecting surface configured differently than illustrated reflecting surface 84. Similarly, the discussed configuration of outer surface 87 may be used in lenses with or without described inner surface 81 and with or without illustrated reflecting surface 84 or with a reflecting and/or inner surfaces configured differently than illustrated examples.

While the illustrated example of lens 80 is configured for off-axial primarily forward distribution of emitter light, it should be appreciated that other types of lenses may be used with optical member 20. Other examples of lenses 80 may include, but not be limited to lenses configured for symmetric axial illumination.

Figure 45:
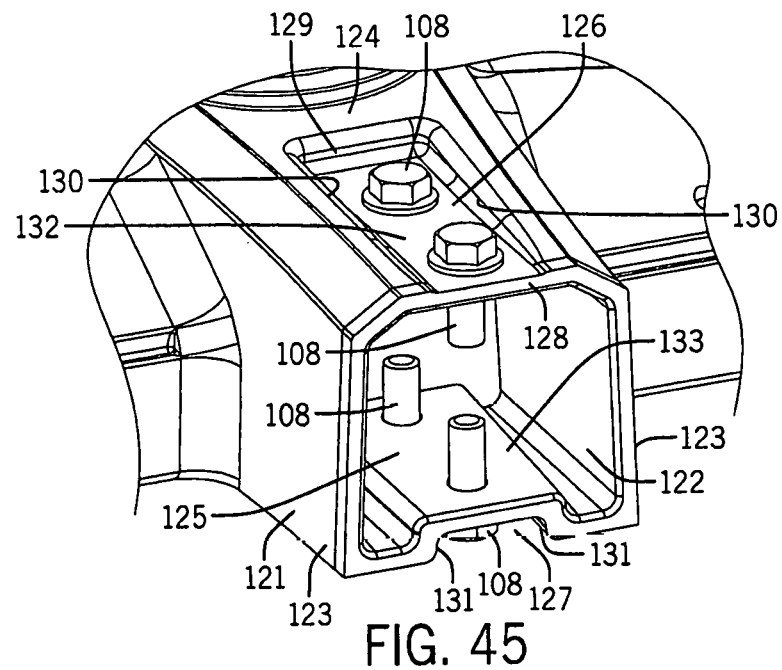
FIG. 45 is a fragmentary rear perspective view showing details of a mounting arm of the LED light fixture of FIG. 38.
Figure 46:
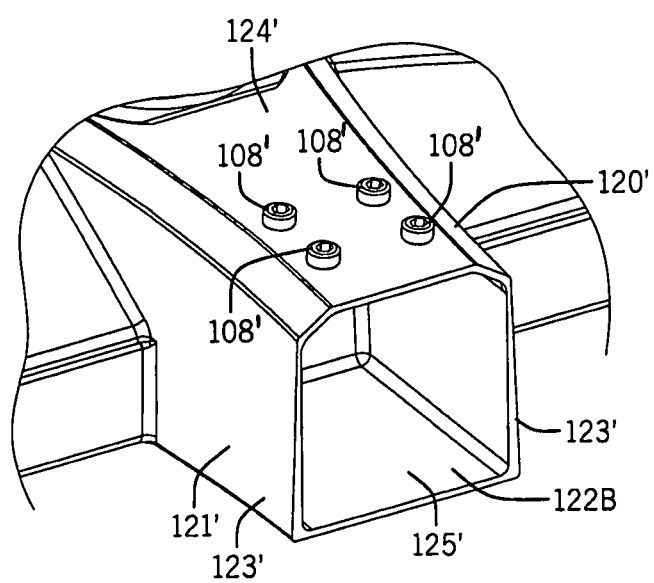
FIG. 46 is a fragmentary rear perspective view showing details of another embodiment of a mounting arm of an LED light fixture.
Figure 47:
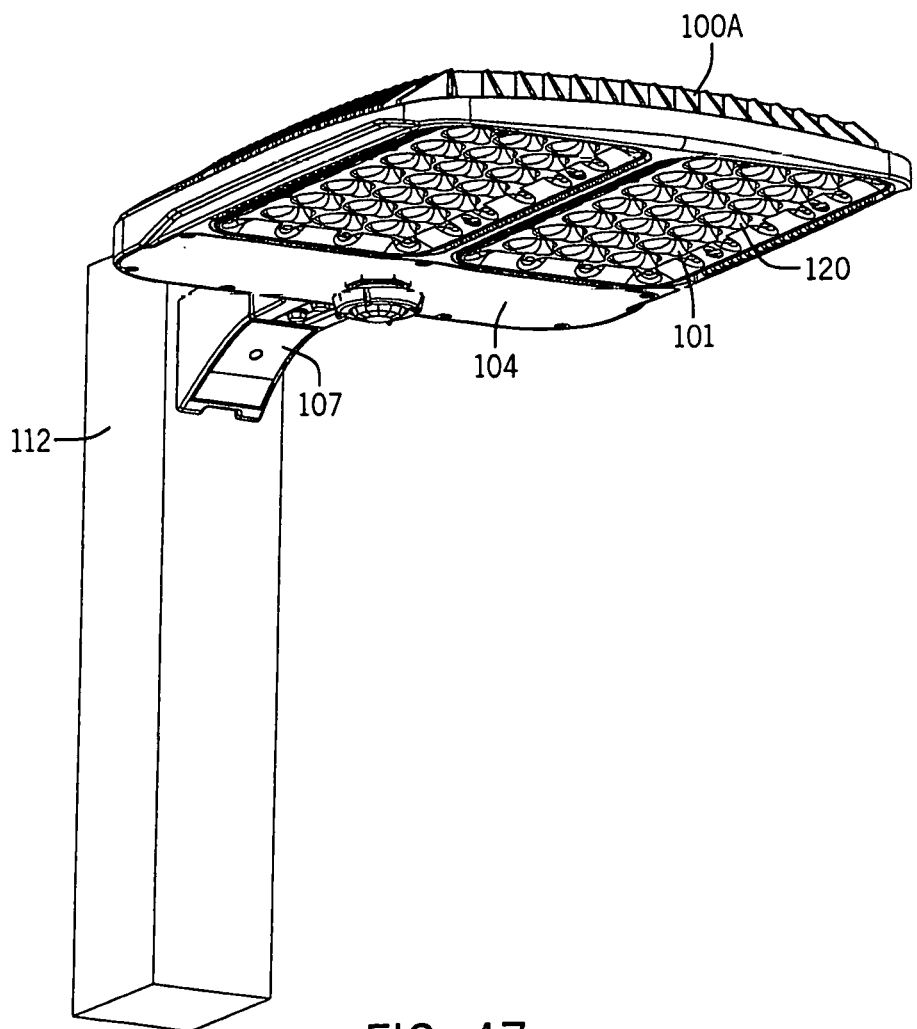
FIG. 47 is another perspective view from the light-emitting side of the LED light fixture of FIG. 17 shown mounted to a pole.

FIG. 47 shows light fixture 100A mounted to light pole 112. FIGS. 45 and 46 show two examples of light-fixture mounting arms 120 including a surrounding wall 121 defining a fitting cavity 122 for receiving a mounting fitter 107. Surrounding wall 121 includes a pair of lateral wall portions 123 and top and bottom wall portions 124 and 125 opposite to each other and being connected by lateral wall portions 123.

FIG. 46 shows mounting arm 120' with major surfaces of top and bottom wall portions 124' and 125' being substantially planar. Mounting arm 120' is shown configured for securement to a mounting fitter 107 with four fasteners 108, all extending through the same wall portion 124'.

FIGS. 45 and 48 show mounting arm 120 surrounding wall 121 including reinforcing recesses 126 and 127 in corresponding one of bottom and top wall portions 124 and 125. It should be understood that the terms "top" and "bottom" are used herein for convenience and to limit the disclosure to any particular orientation. The terms "top" and "bottom" are used for describing the light fixture illustrated in position for downward illumination.

FIG. 45 shows recess 126 of top wall 124 being formed by a cross rib 129 strengthening top wall portion 124. Cross rib 129 is adjoined by a pair of side ribs 130 each extending from one end of cross rib 129 toward an edge 128 of mounting arm 120. Side ribs 130 are shown tapering from the tallest at cross rib 129 toward edge 128. FIG. 45 also shows recess 127 of bottom wall portion 125 being formed by a pair of substantially parallel side ribs 131 strengthening bottom wall portion 125.

FIG. 45 further shows a top middle wall portion 132 and a bottom middle wall portion 133 between a corresponding pair of side ribs 130 and 131. Middle wall portions 132 and 133 each define mounting apertures 134 positioned for alignment with mounting hollows 109 defined by fitter 107, as seen in FIGS. 48 and 49. FIG. 45 shows fasteners 108 inserted toward each other through each of top and bottom wall portions 124 and 125. In the example illustrated in FIG. 45, middle wall portions 132 and 133 each define a pair of mounting apertures 134 accepting a pair of fasteners 108. It should be appreciated that other embodiments within the scope of this disclosure may have at least one mounting aperture 134 defined by each of middle wall portions 132 and 133 and may have more than two apertures defined by each of middle wall portions.

Figure 50:
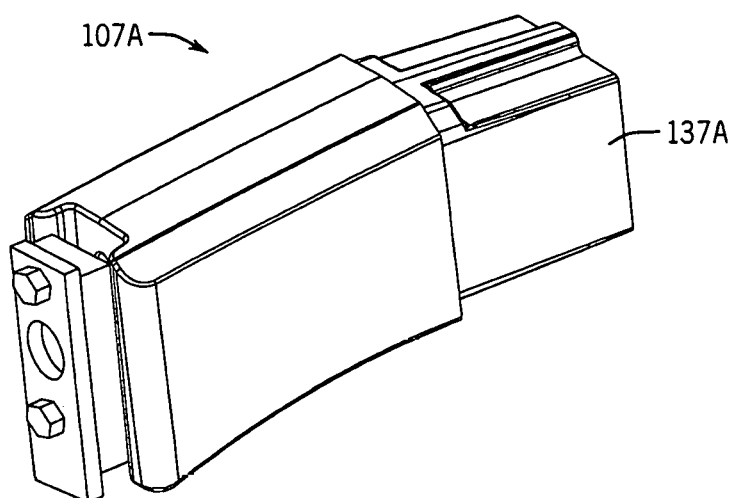
FIG. 50 is a rear perspective view of the mounting fitter of FIG. 49.
Figure 51:
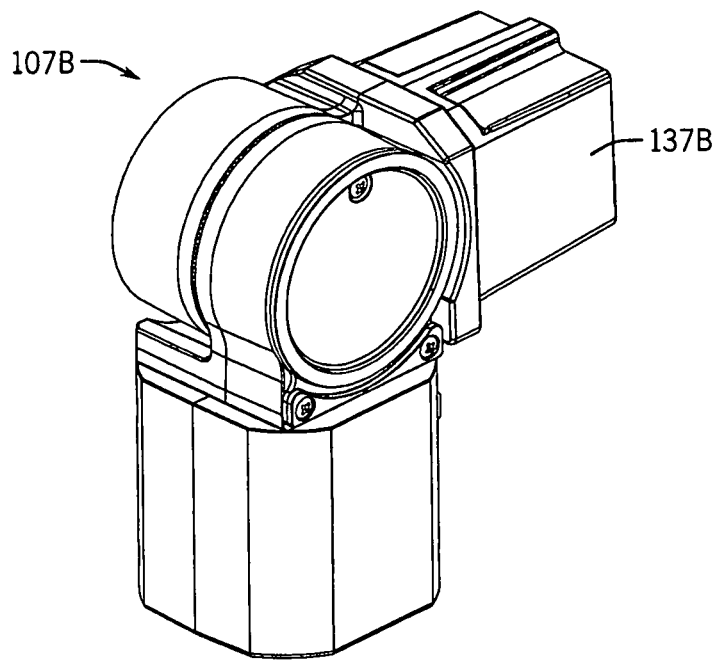
FIG. 51 is a rear perspective view of another embodiment of a mounting fitter.

FIGS. 49-51 show examples of mounting fitters 107A and 107B. FIGS. 48-50 show fitter 107A configured for securing light fixture 100A with respect to a static structure such as pole 112 for a set illumination angle. FIG. 51 shows fitter 107B configured for securing a light fixture with respect to a static structure and providing adjustability of illumination angle. Fitter 107 has an arm engagement portion 137 configured to fit within fitting cavity 122 of mounting arm 120 and to be engaged by fasteners 108 extending through mounting apertures 134 of mounting arm 120.

While the principles of the invention have been shown and described in connection with specific embodiments, it is to be understood that such embodiments are by way of example and are not limiting.

The invention claimed is:

1. A light-emitting arrangement comprising a light-transmissive shield member comprising a substantially planar transparent sheet spanning an optical member which has at least one lens portion configured for receiving and distributing light from at least one light source, the optical member having a light distribution region surrounded by a peripheral region which defines a hollow receiving a fastener shank extending from a fastener head and through an aperture defined by the substantially planar transparent sheet.

2. The light-emitting arrangement of claim 1 further comprising a spacer disposed between the optical member and the transparent sheet and dimensioned according to a minimal distance between the light distribution region of the optical member and the transparent sheet.

3. The light-emitting arrangement of claim 2 wherein:
the peripheral region forms a shoulder about the hollow; and
the spacer is a sleeve over the fastener shank, the spacer extending from one end at the transparent sheet to an opposite end against the shoulder.

4. A light-emitting arrangement comprising:
an optical member comprising at least one lens portion configured for receiving and distributing light from at least one light source and defining a light distribution region surrounded by a peripheral region which has front and back sides and at least partially defining a light-fixture exterior; and
a light-transmissive shield member spanning the optical member and comprising a substantially planar transparent sheet and lateral members which extend from the substantially planar transparent sheet and engage the back side of the peripheral region, thereby securing the shield member to the optical member.

5. The light-emitting arrangement of claim 4 wherein:
the light-transmissive shield member is one piece; and
the lateral members are walls extending from the planar transparent sheet and enveloping the optical member.

6. The light-emitting arrangement of claim 4 wherein the lateral members comprise at least one mounting bracket engaging the substantially planar transparent sheet and extending therefrom to a retention portion which engages the peripheral region of the optical member.

7. An LED light fixture comprising:
a frame including emitter-supporting structures and adjacent structures which define at least one open space permitting air and water flow through the light fixture;
an optical member disposed at the emitter-supporting structures and configured for distribution of emitter light and at least partially defining an exterior of the light fixture; and
a light-transmissive shield member secured with respect to the optical member with a mounting member which extends into and through the open space and engages an opposite side of the corresponding adjacent structure.

8. The LED light fixture of claim 7 wherein the light-transmissive shield member comprises a substantially planar transparent sheet.

9. The LED light fixture of claim 8 wherein the optical member comprises a light distribution region surrounded by a peripheral region which supports the light-transmissive shield member.

10. The light-emitting arrangement of claim 9 wherein the peripheral region defines a hollow which receives a fastener shank extending from a fastener head and through an aperture defined by the substantially planar transparent sheet.

11. The LED light fixture of claim 7 wherein the shield member is one-piece including a substantially planar transparent sheet and the mounting member which extends from the substantially planar transparent sheet.

12. An LED light fixture comprising:
at least one light emitter on a circuit board at an emitter-supporting surface of an emitter-supporting structure;
an optical member having a back side facing the circuit board and configured for receiving a gasket which encircles the circuit board to provide water seal thereabout; and
a peripheral wall extending from the back side of the optical member outwardly around the gasket, the peripheral wall engaging the emitter-supporting structure between the optical-member back side and the emitter-supporting surface to minimize water ingress toward the gasket.

13. An LED light fixture comprising:
at least one light emitter on a circuit board at an emitter-supporting surface of an emitter-supporting structure; and
an optical member having a back side facing the circuit board and defining a recess configured for receiving a gasket which encircles the circuit board to provide water seal thereabout, the gasket having a pair of spaced apart lateral fingers engaging lateral sides of the recess and extending outwardly therefrom, and at least one inner finger extending into the recess offset from the recess lateral sides.

14. An LED light fixture comprising:
a frame including emitter-supporting structures and adjacent structures which define at least one open space permitting air and water flow through the light fixture;
an optical member configured for distributions of light from at least one light emitter; and
an opaque shield disposed along at least a portion of a perimeter of the optical member and secured with respect thereto by a mounting member which extends into and through the open space and engages an opposite side of the corresponding adjacent structure, the opaque shield being configured and dimensioned to minimize or block distribution of light in at least one direction opposite the direction of the primary illumination.

15. The LED light fixture of claim 14 further comprising a light-transmissive shield member secured with respect to the optical member.

16. The LED light fixture of claim 15 wherein the light-transmissive shield member is removably secured with respect to the optical member.

17. The LED light fixture of claim 15 wherein the light-transmissive shield member spans the optical member.

18. The LED light fixture of claim 17 wherein the light-transmissive shield member comprises a substantially planar transparent sheet.

19. The LED light fixture of claim 18 wherein the optical member comprises a peripheral region extending from a light distribution region and supporting the shield member.

20. The LED light fixture of claim 19 wherein the peripheral region of the optical member has a first mounting member engaged by a second mounting member which secures the light-transmissive shield member with respect to the optical member.

21. The LED light fixture of claim 15 further comprising a spacer disposed between the optical member and the light-transmissive shield member and dimensioned according to a minimum distance from a light distribution region of the optical member to the light-transmissive shield member.

* * * * *